(12) United States Patent
Williams

(10) Patent No.: US 10,253,993 B2
(45) Date of Patent: Apr. 9, 2019

(54) TEMPERATURE MODULATED DESICCANT EVAPORATIVE COOLER AND INDIRECT AND DIRECT EVAPORATIVE AIR CONDITIONING SYSTEMS, METHODS, AND APPARATUS

(71) Applicant: MCogen, Inc., Houston, TX (US)

(72) Inventor: Donald Williams, The Woodlands, TX (US)

(*) Notice: Subject to any disclaimer, the term of this patent is extended or adjusted under 35 U.S.C. 154(b) by 338 days.

(21) Appl. No.: 14/461,962

(22) Filed: Aug. 18, 2014

(65) Prior Publication Data

US 2015/0128625 A1 May 14, 2015

Related U.S. Application Data

(60) Provisional application No. 61/867,571, filed on Aug. 19, 2013.

(51) Int. Cl.
| | |
|---|---|
| *F24F 3/14* | (2006.01) |
| *F24F 3/147* | (2006.01) |
| *F24F 6/02* | (2006.01) |
| *F24F 5/00* | (2006.01) |

(52) U.S. Cl.
CPC ............ *F24F 3/147* (2013.01); *F24F 3/1423* (2013.01); *F24F 5/0035* (2013.01); *F24F 2203/104* (2013.01)

(58) Field of Classification Search
CPC ........ F24F 3/147; F24F 3/1423; F24F 5/0035; F24F 2203/104
USPC .............................. 62/93–94; 165/6–8, 4, 10
See application file for complete search history.

(56) References Cited

U.S. PATENT DOCUMENTS

| | | | | | |
|---|---|---|---|---|---|
| 2,266,219 | A | * | 12/1941 | Larriva | F24F 3/1423 165/230 |
| 3,889,742 | A | * | 6/1975 | Rush | F24D 11/007 96/144 |
| 3,941,012 | A | | 3/1976 | Mayer | |
| 4,926,618 | A | * | 5/1990 | Ratliff | B01D 53/06 95/10 |
| 4,991,400 | A | | 2/1991 | Wilkinson | |
| 5,003,961 | A | * | 4/1991 | Besik | F24F 3/1411 126/110 R |
| 5,022,241 | A | * | 6/1991 | Wilkinson | F24F 3/1417 62/271 |
| 5,353,606 | A | * | 10/1994 | Yoho | F24F 3/1423 62/271 |

(Continued)

*Primary Examiner* — Len Tran
*Assistant Examiner* — Kirstin Oswald
(74) *Attorney, Agent, or Firm* — Alberto Q. Amatong, Jr.; Amatong McCoy LLC

(57) ABSTRACT

A method is provided for supplying air conditioned air to a residence or building interior. The method entails positioning a heat and mass exchanger to discharge conditioned air into the residence or building interior. Further, a rotatable desiccant wheel dehumidifier in positioned in fluid communication with the heat and mass exchanger. Supply air is received and treated in the dehumidifier, thereby supplying dry air to the heat and mass exchanger and exhausting hot humid air. The heat and mass exchanger is positioned and configured to receive dry air from the dehumidifier and supply cooler dry air to the residence or building interior, or other target environment. A system is also provided for operating the air supplying or air conditioning method.

20 Claims, 26 Drawing Sheets

(56) References Cited

U.S. PATENT DOCUMENTS

| | | | | |
|---|---|---|---|---|
| 5,373,704 A | * | 12/1994 | McFadden | B01D 53/06 62/271 |
| 5,391,925 A | | 2/1995 | Casten et al. | |
| 5,532,525 A | | 7/1996 | Kaiser et al. | |
| 5,717,394 A | * | 2/1998 | Schwartz | H03M 7/4006 341/107 |
| 5,727,394 A | * | 3/1998 | Belding | B01D 53/06 62/121 |
| 5,782,104 A | * | 7/1998 | Sami | B01D 53/261 62/238.1 |
| 5,860,284 A | * | 1/1999 | Goland | F24F 3/1423 165/60 |
| 5,880,536 A | | 3/1999 | Mardirossian | |
| 5,890,372 A | * | 4/1999 | Belding | B01D 53/06 62/271 |
| 5,918,805 A | | 7/1999 | Guyer | |
| 6,003,327 A | * | 12/1999 | Belding | B01D 53/261 62/271 |
| 6,018,953 A | * | 2/2000 | Belding | B01D 53/06 62/271 |
| 6,053,418 A | | 4/2000 | Guyer | |
| 6,067,482 A | | 5/2000 | Shapiro | |
| 6,084,318 A | | 7/2000 | Mardirossian | |
| 6,234,400 B1 | | 5/2001 | Guyer | |
| 6,757,591 B2 | | 6/2004 | Kramer | |
| 6,813,897 B1 | | 11/2004 | Bash et al. | |
| 6,823,690 B2 | | 11/2004 | Runk et al. | |
| 7,040,544 B2 | | 5/2006 | Guyer | |
| 7,274,975 B2 | | 9/2007 | Miller | |
| 7,284,709 B2 | | 10/2007 | Guyer | |
| 7,675,187 B2 | | 3/2010 | Woods et al. | |
| 7,765,827 B2 | * | 8/2010 | Schlom | F24F 5/0007 62/309 |
| 8,099,198 B2 | | 1/2012 | Gurin | |
| 8,295,950 B1 | | 10/2012 | Wordsworth et al. | |
| 8,491,274 B2 | | 7/2013 | Taylor et al. | |
| 8,593,002 B2 | | 11/2013 | Hamm et al. | |
| 9,470,442 B2 | | 10/2016 | Williams | |
| 2003/0029185 A1 | * | 2/2003 | Kopko | F24F 3/044 62/271 |
| 2007/0112694 A1 | | 5/2007 | Metcalfe | |
| 2009/0012651 A1 | | 1/2009 | Lifson et al. | |
| 2009/0178421 A1 | | 7/2009 | Yeh | |
| 2009/0178423 A1 | | 7/2009 | Yeh | |
| 2009/0228149 A1 | | 9/2009 | Alston | |
| 2009/0228150 A1 | | 9/2009 | Alston | |
| 2010/0242507 A1 | * | 9/2010 | Meckler | F24F 3/1423 62/94 |
| 2011/0154841 A1 | | 6/2011 | Hsiao et al. | |
| 2012/0191253 A1 | | 7/2012 | Rockenfeller et al. | |

* cited by examiner

Components Include

| Gas Engine | High Capacity Starter/Generator | De-super-heater for HVAC Condenser | On Grid and Off Grid capable Inverter | Engine 3 way catalyst Silencer and Exhaust Heat Exchanger |
|---|---|---|---|---|
| 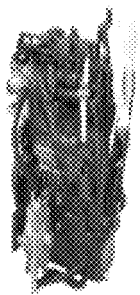 | 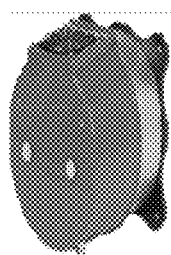 | 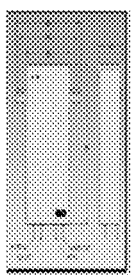 | 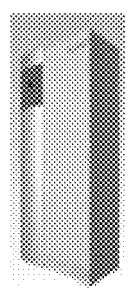 | 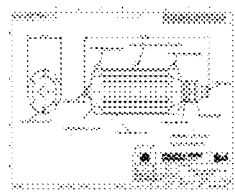 |

Engine Oil Cooler and Lube Oil Expansion Tank

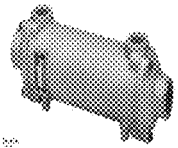

Features may Include:

- 3 tons or more of Cooling Capacity
- 50,000 BTUs of heat
- Inverter System for clean and reliable AC Power
- Auto Start feature that allows for fail safe operation
- 75 to 80% efficiency rating
- Compact Design
- 4KW+ of power with grid connect to allow for net metering
- Quiet Operation
- Multi-Fuel configuration availability
- Battery Bank support for Back Up Power
- Architecture capable of inter-connecting to renewable power sources such as Wind and Photo-voltaics, Hybrid and electric cars, etc..

FIG. 5A

Benefits to the Consumer

- Generates free electrical power while generating heat for commercial process, home heating, recreational heating
- Back Up Power using less than half the fuel used by conventional standby generators
- Surge, Spike and Electric Noise Protection for Appliances and Electronic Equipment
- UPS Fail Safe Power availability
- Reduction of Carbon Footprint

Proven Inverter Technology

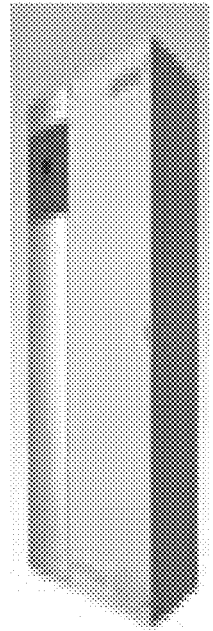

Xantrex On Grid and Off Grid capable Inverters are time tested technology in the Renewable Energy Industry

- True sine wave, 120/240-volt AC, split-phase, inverter/charger
- DC to AC inverter
- Battery charger, and an AC auto-transfer switch.
- Operates with generators and renewable energy sources to provide full-time or backup power.

FIG. 5B

How EVAPORATIVE COOLING works

Desiccant Dehumidifier

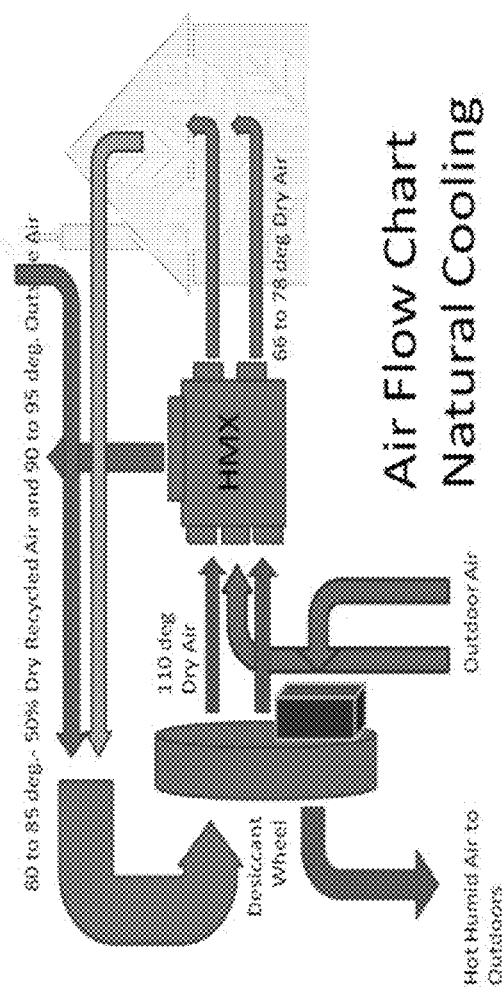
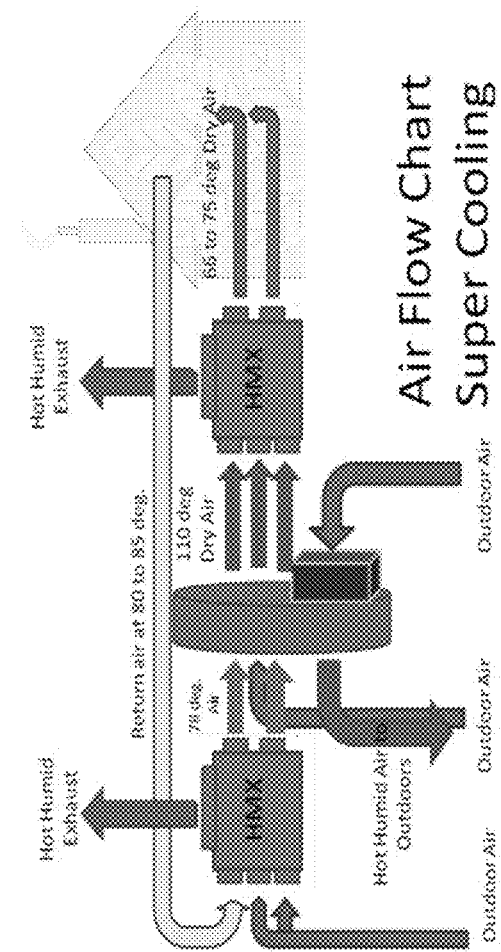

Air Flow Chart With DX Cooling

Air Flow Chart With Heat Pipes

Core Exploded View

Close Up Core

TEMPERATURE MODULATED DESICCANT EVAPORATIVE COOLER AND INDIRECT AND DIRECT EVAPORATIVE AIR CONDITIONING SYSTEMS, METHODS, AND APPARATUS

The present application claims the benefit of U.S. Provisional Application Ser. No. 61/867,571, filed on Aug. 19, 2013, which disclosure is hereby incorporated by reference for all purposes and made a part of the present disclosure.

BACKGROUND

In one aspect, the present disclosure relates generally to systems and methods (and sub-processes and components thereof and therefor) for air conditioning a localized environment. The disclosure also relates to and introduces an improved indirect-direct evaporative air conditioner, methods of operating same, and systems and operations incorporating and/or employing same. In another aspect, the present disclosure relates to power generation and/or distribution, particularly for localized consumption. The disclosure relates to both a system and a method of, or for, power generation and/or distribution. The disclosure also relates to a system and method for meeting the energy demand of a localized environment.

The conventional system of centralized power generation and distribution over a wide geographic network is characterized by vast losses of energy either through thermal loss during production or distribution loss during delivery. It is estimated that only forty percent of the energy generated by such centralized plants in the United States actually make it to the consumer. This grossly inefficient model may be countered somewhat by electric power generating plants that generate power more closely to the consumer and utilizing the thermal energy that is generated as byproduct in electric power generation. In this regard, micro combined heat and power generation systems are available that co generate electricity and heat and utilize the heat on location.

Conventional electric driven air-conditioning systems typically utilize large compressors that are driven by AC inductive motors. These motors demand power for start up and for continuous operation. Reliance on the systems on hot summer days contributes to very high energy demand peaks on the electric grid and inefficiency on our general collective consumption of energy. Internal combustion engines (ICE) can be utilized to drive HVAC compressors directly and the thermal heat generated by the ICE can be used to heat water for domestic use, dehumidify the conditioned air using desiccants, to distill or purify water or to heat swimming pools or Jacuzzis, or in the case of businesses that use boilers, to preheat water for process heat or to generate steam. Small systems that are capable of generating up to 5 KW of electric power and heat simultaneously and at the same time, provide air conditioning are called Micro Combined Cooling Heating and Power (MCCHP) Systems.

Another application in which cogeneration is found is in Auxiliaiy Power Units (APU) for commercial long haul trucks. In the United States, these trucks are required by law to rest for ten hours after eleven hours of driving. APUs are designed to eliminate long idle rest stops. Similar to the MCCHP, the APU uses a small internal combustion engine (ICE), typically fueled by diesel, in lieu of the truck's main engine. Since this engine is much smaller than the main engine in terms of displacement, it uses a fraction of the fuel which would be otherwise required to idle the larger engine. These units can run for as much as eight hours on one US gallon of diesel. The engine provides heat to the main engine so that the main engine can be started easily. An APU can save up to 20 gallons of fuel a day, and can extend the useful life of a truck's main engine by around 100,000 miles, avoiding long idle times. APUs provide the truck cab with electrical power for hotel load requirements and may also include air-conditioning for the truck cab. Some APUs even provide an air compressor that maintains the trucks required supply of high pressure air for suspension, brakes and other requirements.

FIGS. 6-9 are illustrations of conventional HVAC systems including systems employing direct compression systems and systems employing various evaporative cooling subsystems. These include indirect evaporative cooling and indirect evaporative cooling systems. The conventional systems also employ a heat and mass exchanger (e.g., one marketed by or as Coolerado). The heat and mass exchanger consists of a box that separates wet and dry air streams.

There are multiple disadvantages commonly attributed to the conventional air conditioning installations. For example, conventional direct compression cooling systems exhibit high energy consumption, high acquisition and installation cost, and the use of undesirable chemical refrigerants. Also, these systems generate contribute 70% to 80% of residential electrical costs during hot summer months and are the highest contributor to residential peak power demands from the public grid. Furthermore, these systems contribute large amounts of heat to the environment in densely populated cities. For these and a variety of other reasons, some of which are touched on in this disclosure, there remains a need to improve HVAC systems and methods, and more particularly, air conditioning systems and methods.

SUMMARY

Described is an improved system and method for air conditioning. Several embodiments are illustrated, including a system and method utilizing an indirect-direct evaporative air conditioner. Further embodiments also employ a desiccant wheel humidifying/dehumidifying service. In one particular aspect, an improved indirect direct evaporative air conditioner unit is disclosed as well as methods of operating said unit or a system utilizing the unit.

Both a system and a method are disclosed for supplying air conditioned air to a residence or building interior. The method entails positioning a heat and mass exchanger to discharge conditioned air into the residence or building interior. Further, a rotatable desiccant wheel dehumidifier in positioned in fluid communication with the heat and mass exchanger. Supply air is received and treated in the dehumidifier, thereby supplying dry air to the heat and mass exchanger and exhausting hot humid air. The heat and mass exchanger is positioned and configured to received dry air from the dehumidifier and supply cooler dry air to the residence or building interior, or other target environment.

In another aspect, a method is described for generating and distributing electric power for localized use. The method includes providing a substantially enclosed building having an air conditioning and ventilation unit for supplying cooled air within the building. The unit includes a closed loop circuit configured to operate a closed loop refrigeration cycle, including a compressor operable to compress a working fluid of the closed loop circuit. The method entails engaging an internal combustion engine with the compressor, and operating the internal combustion engine to drive the compressor, thereby transferring energy to the refrigeration cycle (and thus, to the localized environment). The method further includes engaging an electric motor with the compressor; and operating the electric motor to drive the compressor, thereby transferring energy to the refrigeration cycle.

BRIEF DESCRIPTION OF THE DRAWINGS

FIGS. 5A-5E are illustrations of excerpts from an exemplary market presentation including slides illustrating exemplary illustrations and exemplary components;

FIG. 15 is a simplified schematic and air flow diagram for an air conditioning system employing "natural cooling" according to the present disclosure;

FIG. 16 is a simplified schematic and air low diagram for a "super cooling" air conditioning system according to an alternate embodiment of the present disclosure;

DETAIL DESCRIPTION

The present disclosure relates generally to an improved system and method for air conditioning. Several embodiments are illustrated, including a system and method utilizing an indirect-direct evaporative air conditioner and\or desiccant wheel. In one particular aspect, an improved indirect direct evaporative air conditioner unit is disclosed as well as methods of operating said unit or a system utilizing the unit.

The present also disclosure relates generally to a system and method for power generation and distribution, particularly for localized utilization or consumption. To illustrate aspects of the system and method, certain embodiments or applications described. Description of these embodiments or applications may be limited to localized environment largely defined by a residence or commercial building. It will become apparent to one skilled in the relevant engineering, architecture, or other technical art, that these aspects in part, or in their entirety, may be equally applicable to other settings and other applications.

In further exemplary applications, a system and method according to the disclosure provides a modular electric and internal combustion engine driven HVAC systems suitable for incorporation with an Auxiliary Power Unit (APU), such as that commonly used for idle reduction in class 8 freight trucks. In another exemplary application, such a system and method may be suitable for use in or with a combined cooling, heating, and power system, such as that employed in stationary applications for residential housing or commercial office buildings. Such a system for localized use is often referred to as a Micro Combined Cooling, Heating and Power System or MCCHP system.

Figure 1A:
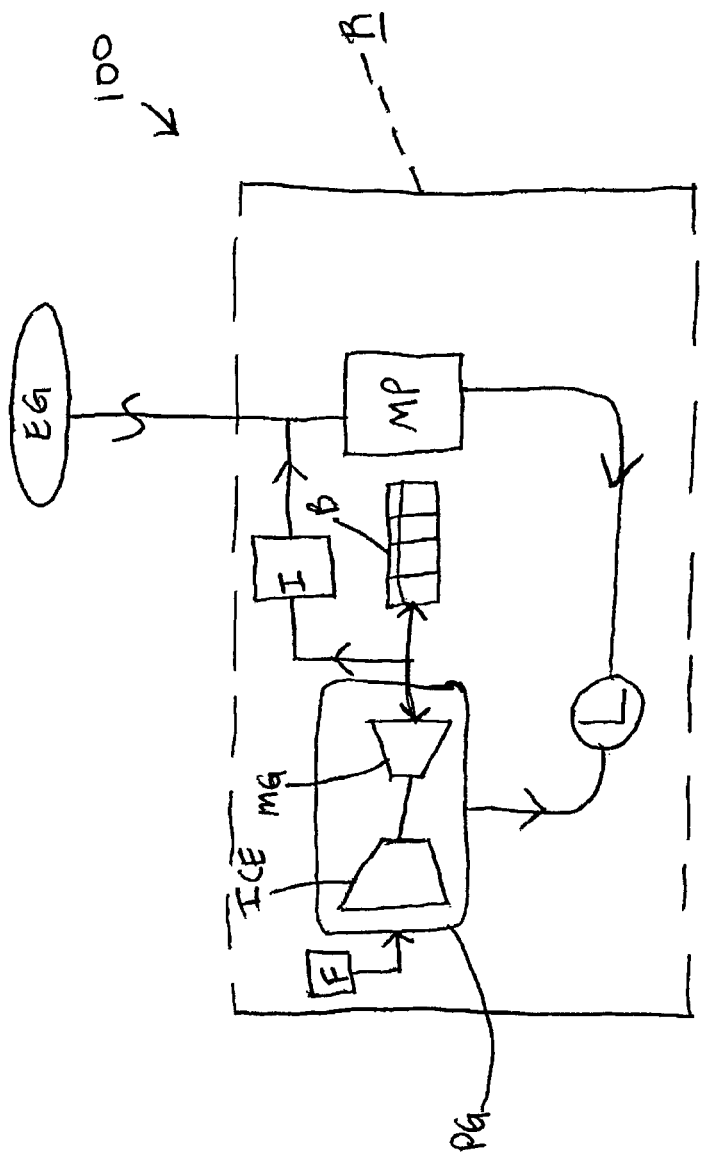
FIG. 1A is a simplified schematic of the basic components of a power generation and distribution system according to the present disclosure.

FIG. 1 depicts an exemplary system installation 100 for generating and distributing power in a localized environment. The depicted system contains some of the basic components of the system. In this example, the localized environment is provided by a permanent residence (R) (or commercial office building) that is also connected to, and supplied by, the electrical grid (EG). As is typical with such environments, and well suited for the system installation of the disclosure, the residence (R) is characterized by one or more energy demand loads (L), including, for example, air condition cooling demand, electricity demand for ordinary lighting and appliances. In further applications and installations, the localized environment may also exhibit heating demands (as also described herein), for example, for space heating or preheating of hot water systems. It should be noted that when referring to the localized environment, e.g., a residence or a building, in describing the system, installation, or method of operation, components of the localized environment may include equipment, units, or systems not necessarily physically located within the physical boundaries or enclosure of the residence, building, or vehicle (or other localized enclosure or environment). Such auxiliary components or systems may be physically located, partially or entirely, apart from the residence, building, vehicle, and the like, but operably associated therewith and serving the demands of the localized environment.

To satisfy the requirements of the energy demand loads (L), the residence (R) may draw power from the electrical grid (EG). As known in the art, power is supplied from a low voltage transformer to the AC load panel (MP) of the residence (R), which may include a main panel and distribution panel connecting to the various loads in the physical residence. The exemplary system further includes a power generator (PG) that is operable to meet some or all the demand load (L) of the residence (R), temporarily or permanently in lieu of the electrical grid (EG). In one aspect of the disclosure, the power generator (PG) is a hybrid power generator that includes an internal combustion engine (ICE) as a prime mover and a motor generator (MG), both of which may be engaged to output power (i.e., rotating mechanical energy) for use by the residence (R). In preferred installations, such a hybrid power generator (PG) is selectively operational in at least a first mechanical drive mode in which the fuel consuming prime mover (ICE) is engaged and a second mechanical drive mode in which the DC motor generator (MG) is engaged. Such selective drive capability may be embodied in a drive assembly (DA) that is engageable with each of the engine (ICE), motor generator unit (MG) and the load (L).

In this installation, a fuel supply (F) such as natural gas, diesel, or propane may be supplied to the installation 100 for consumption by the power generator (PG). In a further aspect, the power generator (PG) may also be operable in a drive mode in which the internal combustion engine (ICE) also drives the motor generator to generate DC power. This DC output may be directed for storage by a battery bank (B) or to an inverter (I) for conversion to AC power. The AC power may, in turn, be directed to the main panel (MP) for use in the residence or in particular applications, to the electrical grid (EG) for distribution.

Thus, in one respect, the system installation 100 provides for a localized environment access to an energy source independent from the electrical grid. This energy source originates from fuel supplied to an internal combustion. Chemical energy is converted to mechanical energy that is then utilized in meeting a load requirement of the localized environment. Alternatively, the mechanical energy may be used to generate DC power to satisfy immediate loads demands of the localized environment, or to store in the battery bank. In the latter case, the energy stored may be used later to drive the engine (and generate energy for meeting the demand load).

In further installations, heat energy generated by operation of the power generator (PG) (i.e., from chemical reactions or mechanical processes within the engine) may also be transferred to the residence (R) to satisfy, at least partly, the energy demands of another load (L). For example, heat exhausted by the engine may be used to heat or preheat water in the HVAC system, pool water, or a water heater, or heat air used for space heating.

Figure 1B:
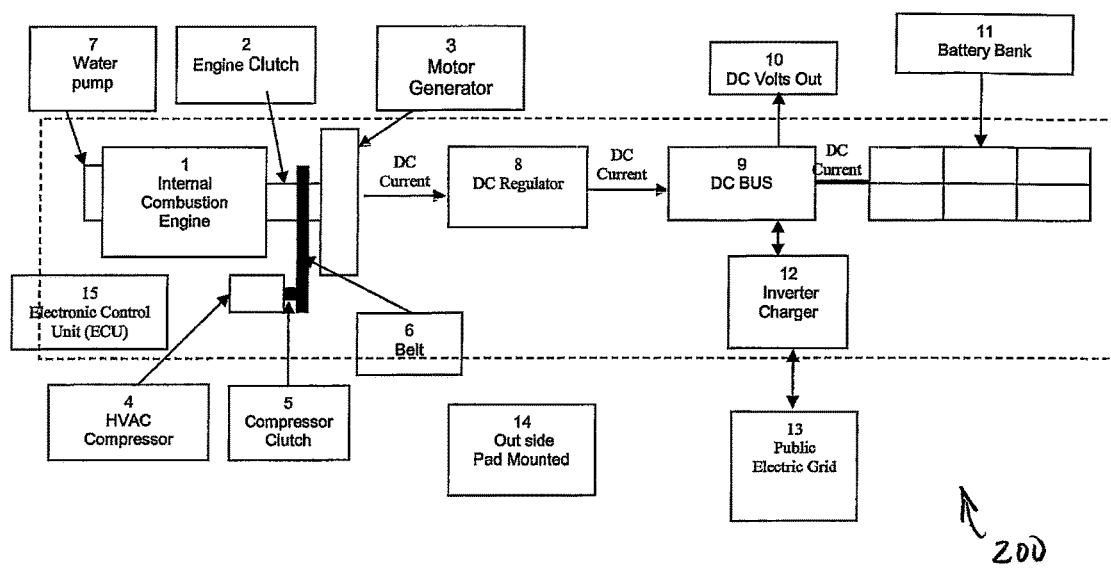
FIG. 1B is a simplified schematic of an exemplary power generation and distribution system installation according to one embodiment of the present disclosure.

Referring now to FIG. 1B, an exemplary system installation 200 for a localized environment is shown servicing a house or residential unit (R). The system 200 preferably integrates a hybrid power generator with the energy demand loads of the residence, which may include a heating, ventilation, and air conditioning system (HVAC) as commonly utilized in these installation. The HVAC system features a compressor 4 compressing a refrigerant or working fluid. The installation also includes a low voltage household circuit for supplying electricity to household appliances and equipment, outlets, and lighting. The household circuit includes a main panel to which utility power from the electrical grid 13 is supplied, as generally known in the industry. In operational mode, the power generator drives the compressor 4 to increase refrigerant vapor pressure. For example, in the case of a common centrifugal compressor, the power generator drives the main shaft (and impeller) of the compressor.

In yet another aspect of the disclosure, the hybrid power generator employs two power sources each of which may be selectively engaged with the compressor 4. In this example, the power sources are an internal combustion engine 1 and a motor generator 3. The internal combustion engine 1 is preferably pad mounted and situated adjacent the outside of the house. The engine may be one of various designs that are commercially available. In certain preferred embodiments, the engine 1 is a natural gas or propane engine. One suitable internal combustion engine is natural gas engine from Kubota (Kubuta DG972) which is rated at 25 (power output). The power generator is preferably equipped with a drive assembly including an engine clutch 2 and belt drive 6 that operably engages the engine 1 with the compressor 4, when a compressor clutch 5 is engaged. The drive assembly, specifically engine clutch 2, can also engage engine 1 directly with the motor generator unit 3.

In this preferred installation, the motor generator is a DC high capacity started/generator such as ECycle. The motor generator 3 is connected with a DC regulator 8 and thus, a DC power supply. As shown in FIG. 1B, the installation further includes a DC bus 9 that serves both an inverter charger 12 and a battery bank 11, as well as providing an auxiliary DC power outlet 10 for other residential usage. The inverter charger 12 connects with the electrical power supply (i.e., electrical power grid 13) to deliver excess AC power to the grid or bring AC power to the DC bus for distribution. In further applications, renewable electricity generators (e.g., solar panels or wind turbines) may be integrated with the installation to deliver additional energy supply. In such cases, the inverter 12 may be utilized for receiving and converting the additional electricity source.

In a further exemplary system, an electrical control unit or ECU 15 is incorporated as the controller of the system and provides the logic (hardware and software) for activating the engine clutch 2 between the internal combustion engine 1 and the motor generator 3. With proper mutual engagement of the motor generator 3 and engine 1 via engine clutch 2, the ECU 15 initiates rotation of the motor generator 3 to start the internal combustion engine 1. The engine 1 will, according to the settings of its governor, which is also programmed within ECU 15, allow the engine 1 to throttle to a set rpm. At this operational setting, the engine 1 overcomes the motor generator 3. In this mode, the motor generator 3 generates and delivers DC power to the DC regulator 8 and preferably, to the battery bank 11 for charging.

As dictated by the demands of the installation, the ECU 15 activates compressor clutch 5 to engage the AC Compressor 4. The hybrid power generator then drives the compressor 4, thereby transferring energy to the HVAC system of the residence. In normal operation, the engine 1 will drive the compressor 4 to compress the working fluid of the HVAC system as required by the appropriate closed loop refrigerant cycle. As determined by the ECU 15 (and as programmed by the user), the engine clutch 2 may simply be disengaged from the motor generator 3. Power provided from battery bank 11 may then be used to run motor generator 3 and thereby, drive the compressor 4. In certain applications, the choice of drive will be done automatically via the electronic control module (to optimize efficiency) or manually (by the operator to comply with noise and emissions regulatory issues). Factors or criteria determining which drive mode to employ include the availability of electrical power from the battery bank or the grid, fuel supply status for the engine for the engine, as well as the demand load presented by the residence. In any event, the ECU 15 may be programmed or configured to receive and/or process input representative of these factors, and determine the various drive modes of the power generator.

While motor generator 3 is engaged and operating as a DC generator, its voltage is regulated to 14, 48 or 56 volts and sent to a DC Bus 9 which in turn, provide powers for DC loads within the installation. Alternatively, it can provide DC power to inverter 12 and provide AC loads to the application or to the electric grid (for a fee or subsidy used by the local utility. A small battery bank 11 preferably stores power and makes power available to start the motor generator 3. Further, the battery bank 11 may be utilized to provide a supplemental power needed to accommodate for DC or AC load spikes.

In preferred applications, the load from the generator is provided as a DC load so as to allow other DC loads from renewable power sources to feed in to the DC bus and share a common Inverter. ECU 15 may be connected with inverter charger 12 to monitor AC current load demand so that it may start the generator 3 in the event that the load so requires. Furthermore, the inverter charger 12 may provide an additional source of DC power to the DC bus, which may then be used to charge the battery bank 11.

Figure 2:
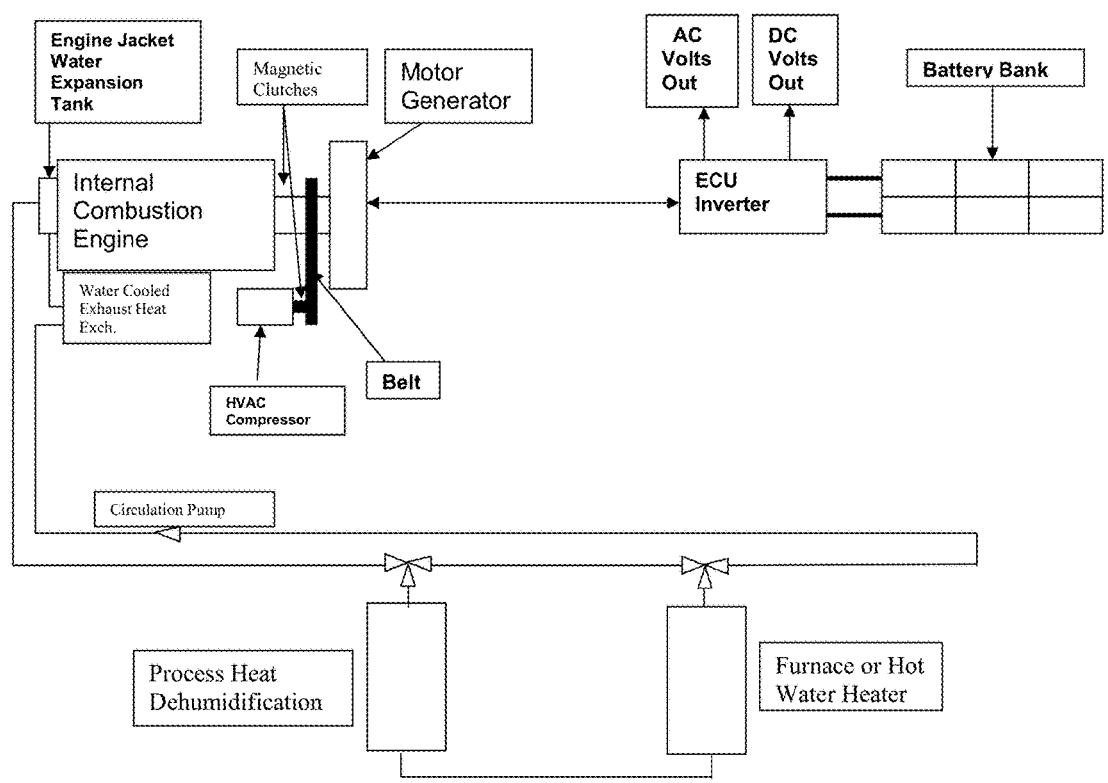
FIG. 2 is a simplified schematic of a power generation and distribution system installation according to an alternate embodiment.

With reference now to FIG. 2, a further and alternative installation according to the disclosure incorporates a closed loop heating circulation system. The installation utilizes heat generated in the operation of the engine for satisfying, at least partially, further energy demands of the residence. In the specific installation illustrated, heat generated by the engine is used to preheat or heat furnace water or hot water systems. An exhaust heat exchanger installed and positioned in fluid communication with the exhaust side of the engine's circulation cooling system (as schematically represented in FIG. 2) is preferably employed to transfer heat generated by the engine. In this embodiment depicted by FIG. 2, a water circulation line is connected with a process dehumidification unit and/or furnace or hot water heater. Thus, in a further example, the circulation line passes cool water through coils of the heat exchanger, whereby heat is transferred from the engine's circulation to the cooler residential circulation water line. The heat is then passed to the demand for such use as preheating the furnace water or water for the water heater.

In the case of an APU application, the hybrid power generator may be implemented for the purpose of helping the system meet operational restrictions or noise or emissions. By simply engaging the electric motor to drive the ac compressor, using available battery power, the level of noise or emissions normally generated would be reduced (from that generated by internal combustion engine or other auxiliary power generator commonly employed by commercial long haul trucks.

Exemplary Component Descriptions

The descriptions below are provided to illustrate the types or specifications for various components suitable for incorporation into one or preferred embodiments of the system (operation of these exemplary systems). The component descriptions are provided for illustration only, and shall not be construed as limiting the disclosure and its concepts.

Internal combustion engine: Prime mover for the generator an or the HVAC compressor, may be a KUBOTA Engine or similar.

Motor/generator: provide power to start Internal combustion engine and/or the compressor or other equipment. This unit may also act as a generator when overcome by the engine, may be an ECycle brushless motor.

Inverter/charger: This unit converts DC power to AC and preferably incorporates power islanding features, charging capabilities, power monitoring capabilities and automatic transfer switch. Suitable models include the XANTREX or Schneider model 60048 On Grid and Off Grid Inverter.

Battery bank: May be AGM, Deep Cell or another battery capable of producing as much as 100 ah or more at 48 volts or 200 ah or more at 24 volts or 400 amp hours or more at 12 volts. Most battery types available in the market are suitable, including those suitable for golf cart or marine applications.

DC Regulator: capable of regulating the output voltage of the DC motor to 48, 24 or 12 volts, may be manufactured by America Power Systems Inc.

Engine clutch: magnetic clutch similar to those used in vehicular HVAC compressor systems.

Compressor clutch: magnetic clutch similar to those used in vehicular HVAC compressor systems.

ECU: capable of multiple analog and digital Inputs and Outputs similar to those found on DC generators such as the Deep Sea 4700 series controller.

Exemplary Power Generator Operations

Figure 3:
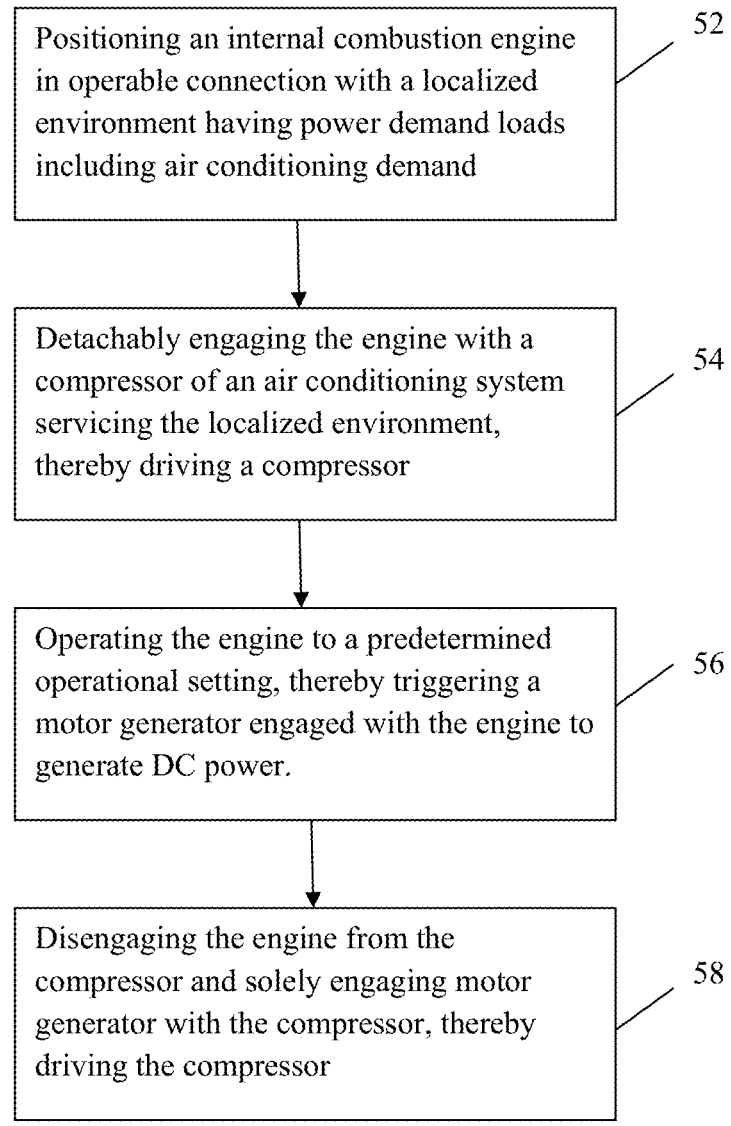
FIG. 3 is a simplified flow chart of a process for generating power for localized consumption.

The flow chart of FIG. 3 illustrates steps associated with at least one exemplary method of power generation and/or distribution according to the disclosure. The method is applicable to and associated with a localized environment having demand loads, such as a stationary environment in the form of a residence or commercial office building, or a truck having a main propulsion engine and an APU. The process represented by the flow chart is provided for illustration and to highlight various important capabilities of a preferred system and method.

A preferred method entails providing such a localized environment having a demand load such as an air conditioning unit. The air conditioning unit includes an AC compressors, as described above. An internal combustion engine is situated in or about the localized environment (52) and preferably, selectively and/or detachably engageable with the AC compressor to drive the compressor, thereby transferring mechanical energy to the compressor (54). This also transfers energy to the refrigeration cycle operable by or through the air conditioning system, and more specifically, the working fluid of the cycle. In this exemplary method, a DC motor generator is operated to initiate or start the engine. The engine is further driven to a predetermined setting (i.e., set RPM), at which point the motor generator begins to generate DC power (e.g., the motor is overcome by the engine (56)). In further embodiments, the DC power generated may be communicated forward and utilized within the localized environment (e.g., provide a DC power supply to household equipment). In further applications, the DC power may be used to charge a battery bank and alternatively, the battery pack may supply DC power to the motor generator for driving the AC compressor or for initiating start-up of the internal combustion engine. In a further exemplary step, the internal combustion engine may be disengaged from the AC compressor and the motor generator engaged to drive the AC compressor, instead 58. In this mode, the motor generator is driven by DC power supplied by the battery bank.

In one respect, the present disclosure teaches generating power for a localized environment, or more specifically, converting and transferring energy for ultimate consumption by or in the localized environment. In this way, energy is transferred to meet a load (energy) demand of the localized environment. In certain of the embodiments discussed above, chemical energy in the fuel supply is converted to mechanical or rotational energy (in the internal combustion engine). In specific examples, mechanical energy in the engine is used to rotationally drive the compressor, which in turn compresses the working fluid, thereby transferring the mechanical energy to the working fluid and for use in the refrigeration cycle.

Figure 4:
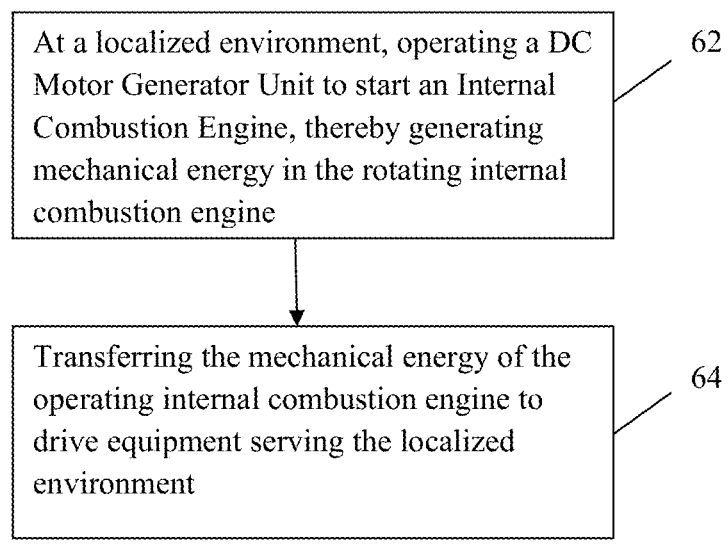
FIG. 4 is a simplified flow chart of yet another alternative process or method for generating power for a localized environment.

Referring to FIG. 4, a basic process embodied by various applications further involves the utilization of stored energy in the battery bank to turn the motor generator unit (62). Functioning as a starter, the motor generator cranks the internal combustion engine, thereby facilitating its start-up and generating mechanical or rotating energy therein. This mechanical energy is then applied to drive a compressor or other equipment serving the localized environment 64, effectively transferring the generated energy to meet demand load of the localized environment.

Figure 5C:
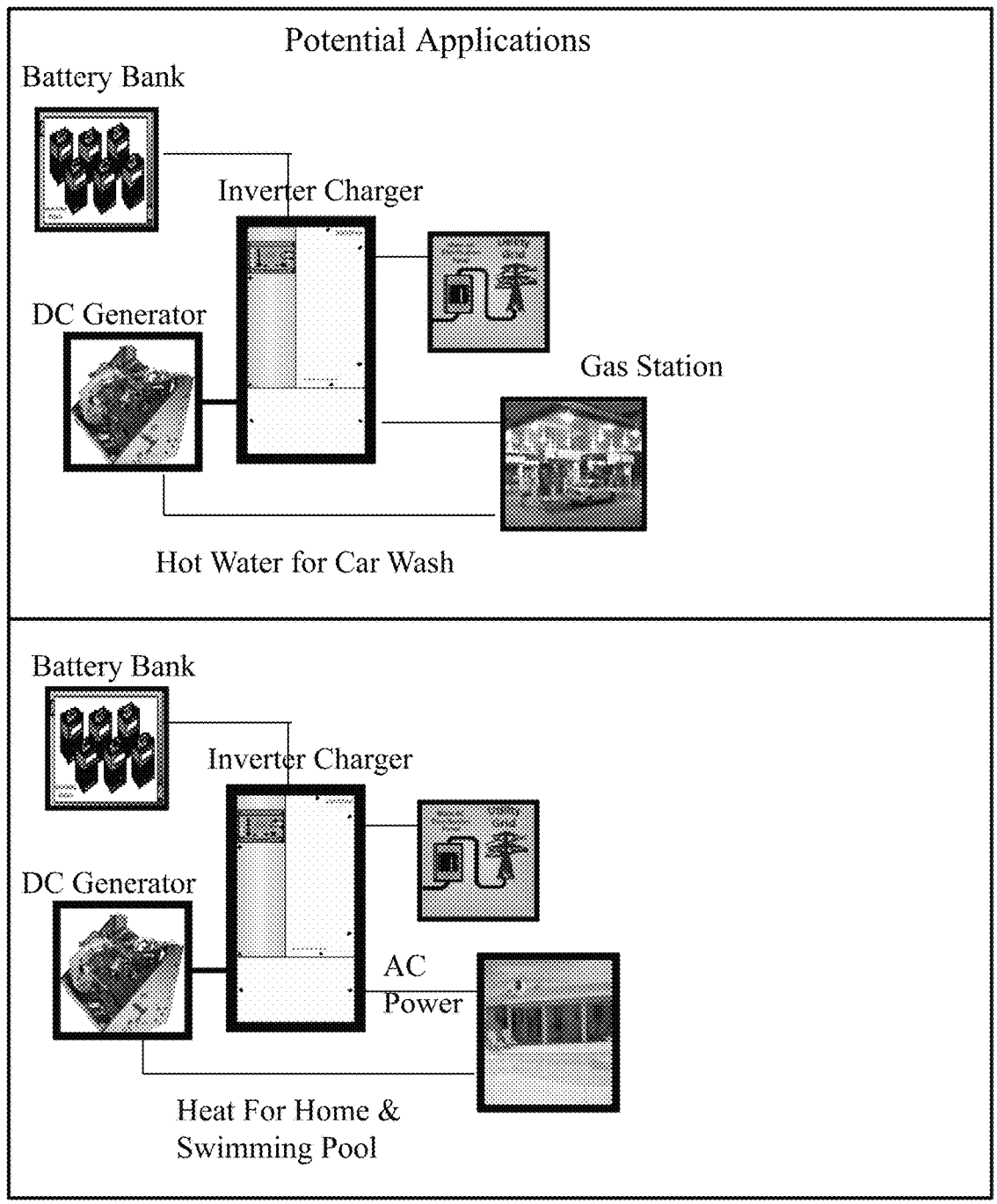
Figure 5D:
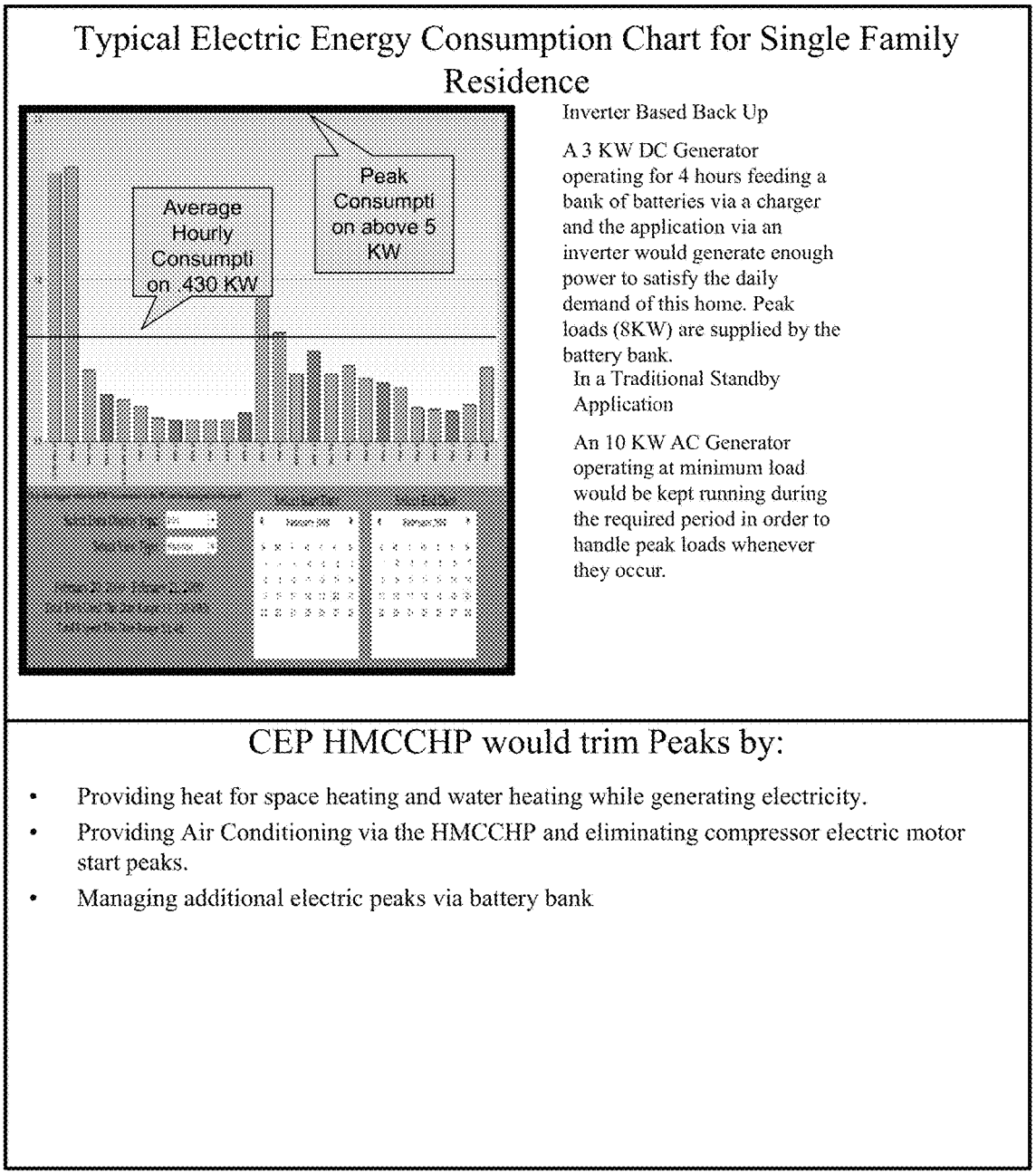
Figure 5E:
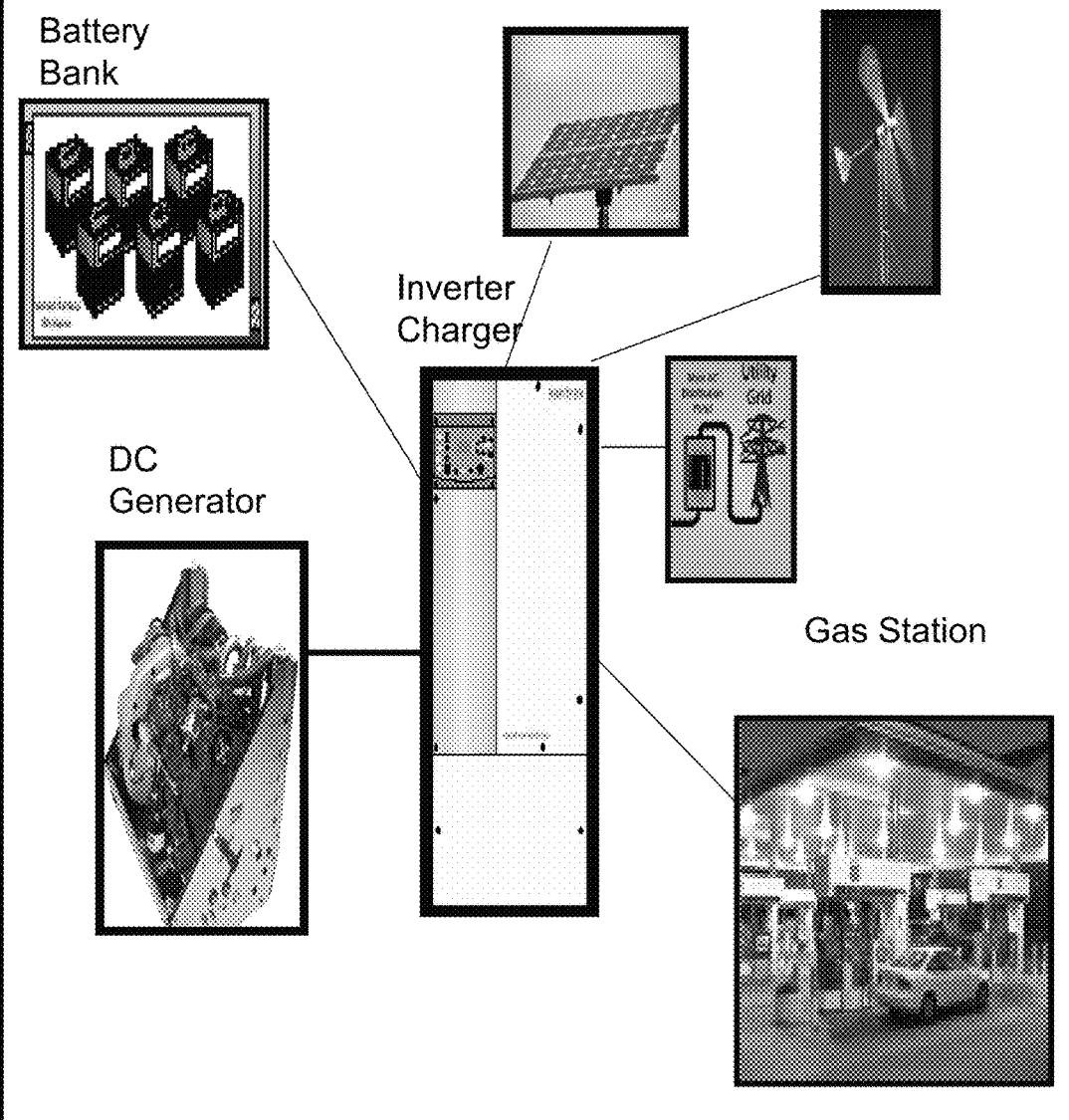
Figure 6:
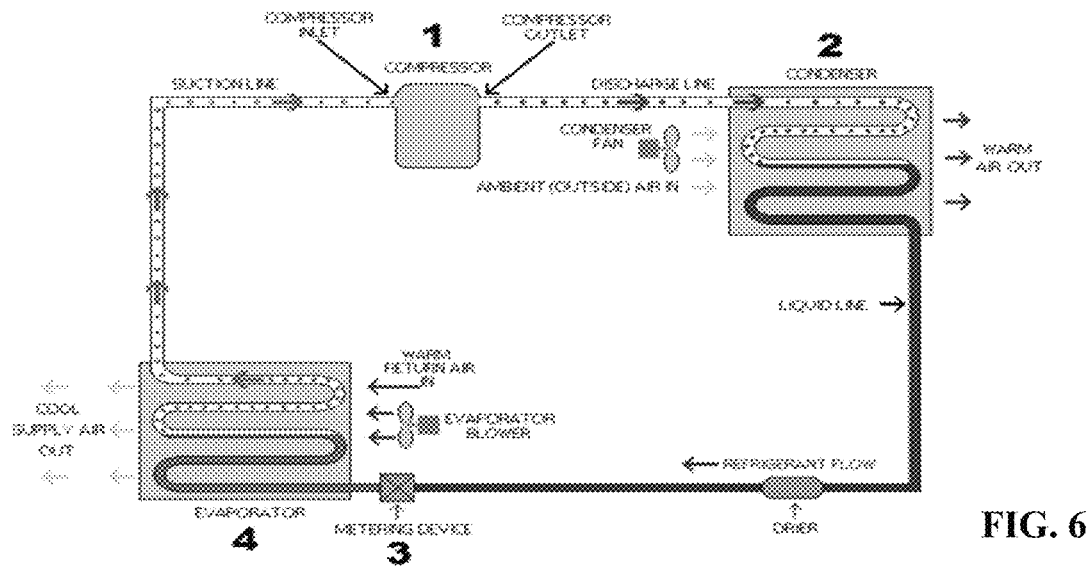
FIG. 6 is a schematic of a conventional direct compression HVAC system.
Figure 7:
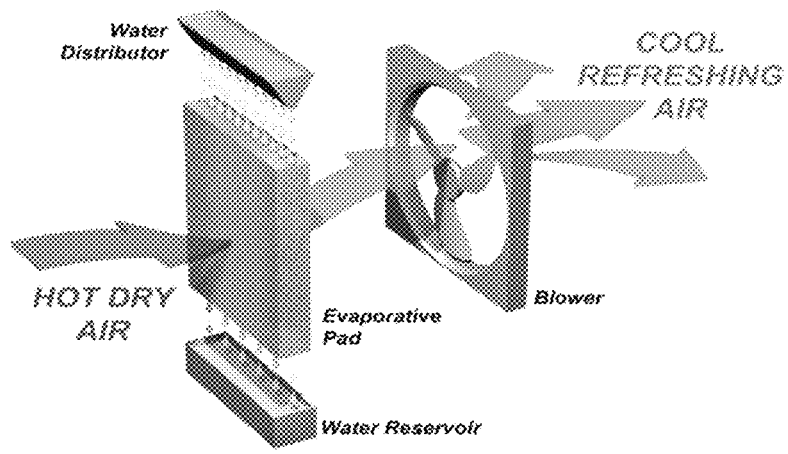
FIG. 7 is a diagrammatical view of a conventional evaporative cooling system.
Figure 8:
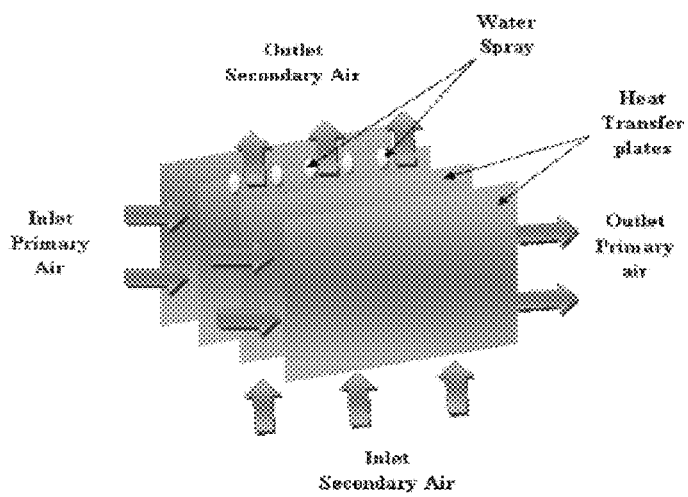
FIG. 8 is simplified diagrammatical view of a conventional indirect evaporative cooling system.
Figure 9A:
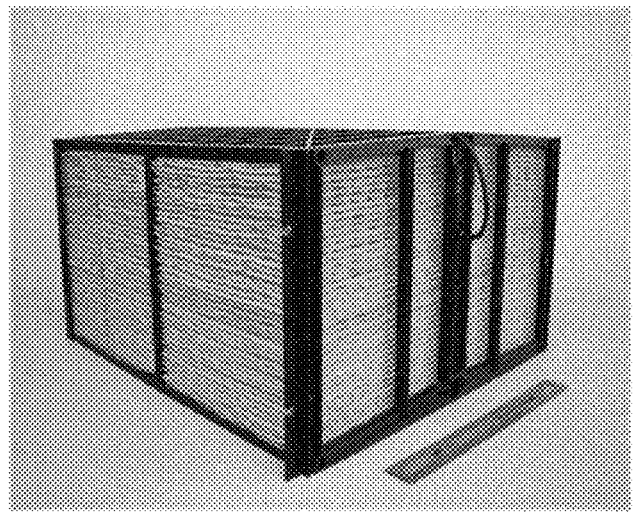
FIGS. 9A-9C are various views of a heat and mass exchanger suitable for various embodiments of a system and method of the present disclosure.
Figure 9B:
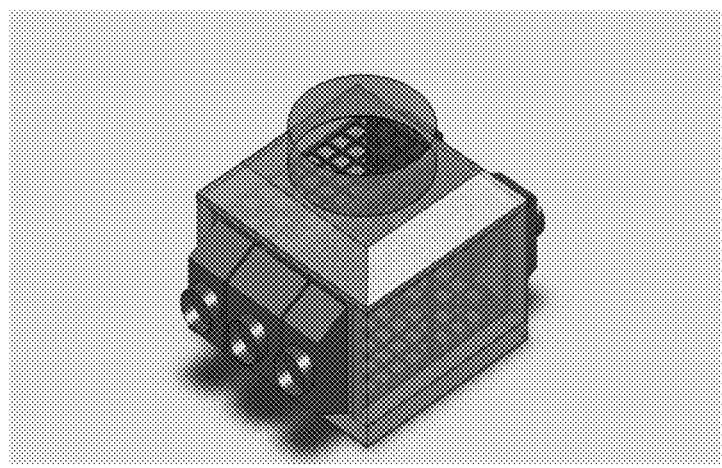
Figure 9C:
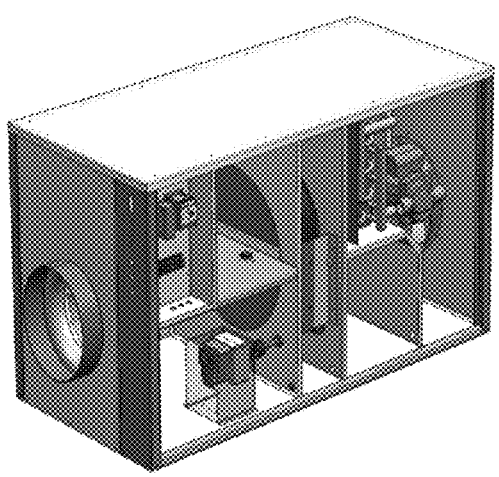
Figure 10:
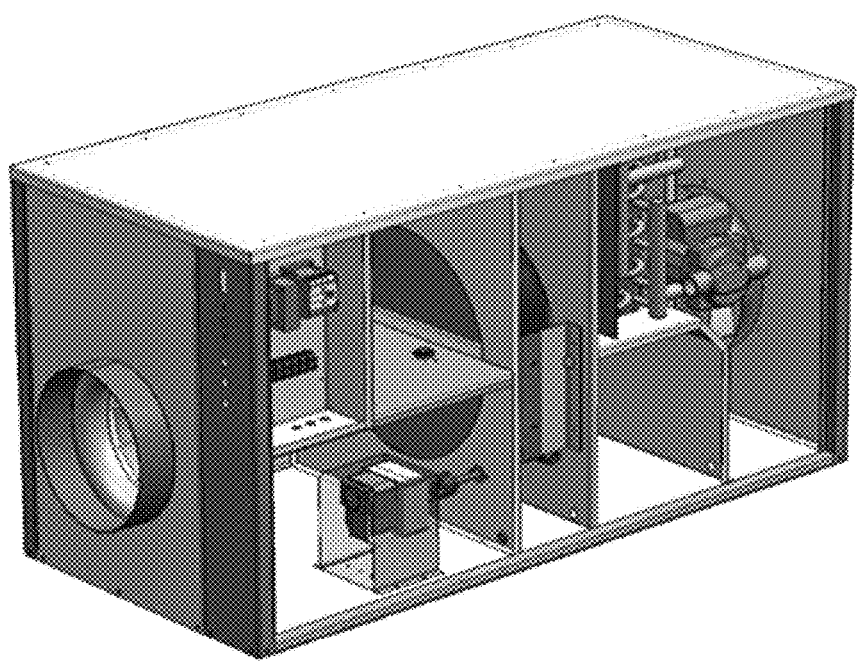
FIG. 10 is a perspective view of a desiccant dehumidifier apparatus suitable for use with various embodiments of a system and method according to the present disclosure.
Figure 11:
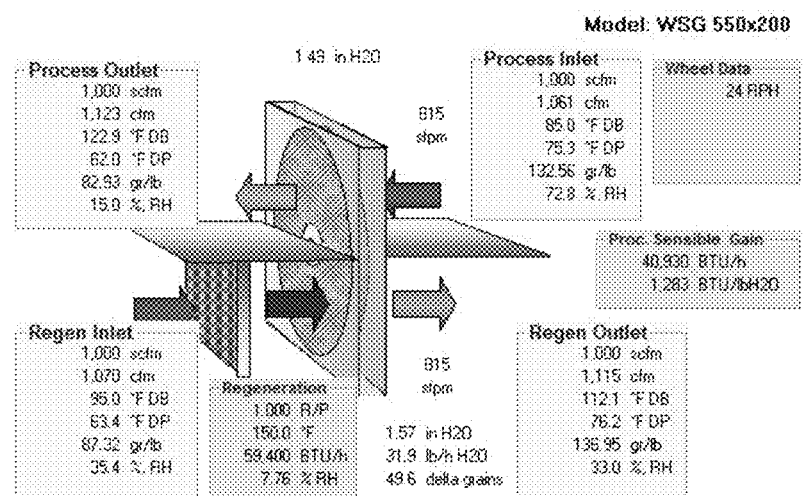
FIG. 11 a is simplified schematic of a desiccant dehumidifier system suitable for use with various embodiments of the present disclosure.

FIG. 5 are excerpts from a proposed marketing power point presentation, which provides yet further examples of preferred embodiments of the disclosed systems and methods. The presentation describes benefits associated with implementation of the systems and methods, as well as components and equipment that are likely to be well suited for incorporation with these systems and methods.

Systems and Methods for Air Conditioning

FIGS. 6-9 are simplified illustrations of systems for heating and cooling a habitable space, such as a residence, office location, or equipment and product storage. These conventional technologies are provided herein as background and to help illustrate and highlight the particular contributions described herein. FIGS. 10-26 are simplified illustrations of improved systems and methods (and components, apparatus, and subprocesses therefor) for air conditioning a local environment, according to the present disclosure. It is contemplated, however, that the most suitable or most advantageous installations for the described systems will be a residential unit or commercial building. Accordingly, the FIGS. and descriptions are provided, for illustration only, in the context of a residence requiring the typical heating, cooling, and power needs. The system and method improvements addresses one or more of the disadvantages and deficiencies of conventional systems.

Table 1 and Table 2 below outlines problems attributable to conventional evaporative cooing and indirect evaporative cooling, respectively.

TABLE 1

Common Disadvantages of Conventional Cooling Systems

Conventional Evaporative Cooling
    Uses inexpensive, natural water evaporation to cool
    However:
        Not effective enough in humid environments
        Dampens the air while cooling
        Theoretic drying limit to Wet Bulb Temp
Indirect Evaporative Cooling
    Uses inexpensive, natural water evaporation to cool
    air without adding moisture to the process air
    However:
        Not effective enough in Humid environments
        Theoretic drying limit to dew point
        temperature Various preferred embodiments of the system and\or method employ, among other things, combinations of indirect evaporative cooling, vacuum evaporative cooling, desiccant wheel dehumidification, water pre-conditioning, and\or heat modulation of working air to achieve objectives. Such combinations are featured in the systems depicted in FIGS. 10-26. Depending on the specific embodiment, the resulting system advantages include the following:

Lower acquisition and installation costs
50 to 90% energy savings
Lower maintenance costs
Lower or no use of ozone depleting refrigerants
Higher admittance of healthier fresh outside air
No excess heat contributed to exterior environment
Natural process involving water and natural desiccants (salt)
The hotter it gets the more efficient the cooling Various embodiments employ increased evaporation and cooling techniques that achieve various operational features. Table 2 below provides a list of some of the techniques implemented. FIGS. 10-26 show exemplary system configurations wherein one or more of these techniques are employed.

TABLE 2

Evaporation and Cooling Techniques Employed in FIGS. 10-26

Figure 12:
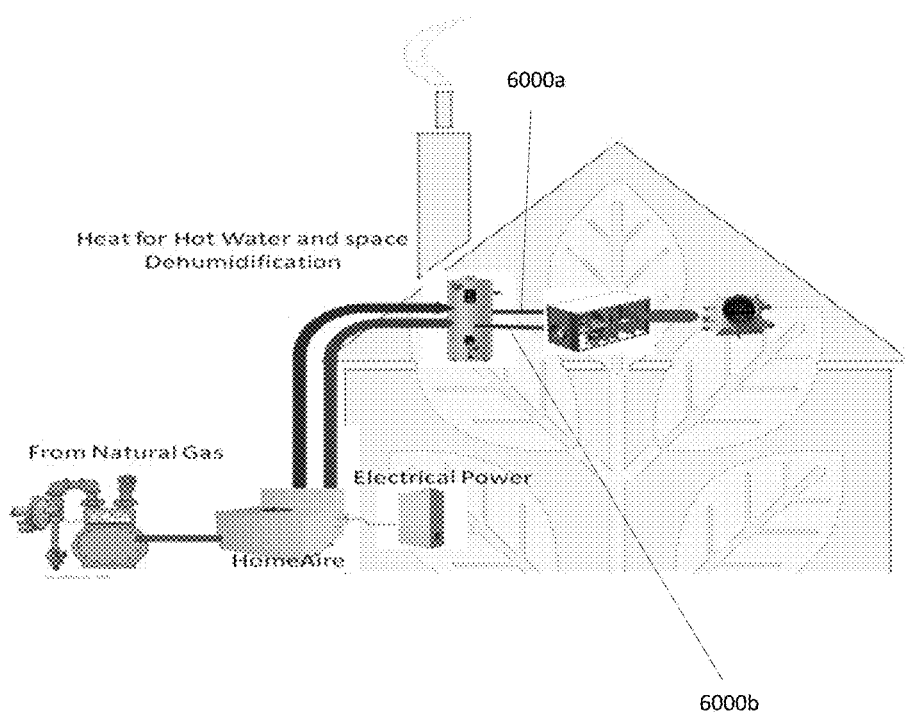
FIG. 12 is a simplified system diagram of a system employing waste heat and a desiccant dehumidifier-heat and mass exchanger installation to supply air conditioning to a residence, according to the present disclosure.

Increase Evaporation Air Flow
Modulated Pre Heating of working air
Increased Evaporation Surface
Dehumidification of working and process air
Water (refrigerant) Treatment
Creation of Vacuum to reduce evaporation area
pressure It should be noted that the described systems and methods are also well suited to incorporate or utilize various energy sources, including systems previously described (i.e., in respect to FIGS. 1-5). The following are a few examples of such energy sources:

Combined Heat and Power
Solar Photo Voltaic and Heating
Waste Heat
Natural Gas and other Fossil Fuels The system configuration of FIG. 12 illustrates an exemplary residential installation utilizing a common energy sources (natural gas) to serve a power unit that ultimately provides electrical power to the residence. This particular system utilizes, however, "extra" energy sources within the residence. In this embodiment, excess heat from the power unit is used by the hot water heater. Further, the residence' hot water heater is incorporated with the dehumidifier and ultimately, the heat and mass exchanger for cooling the residence as indicated by lines 6000a and 6000b.

Figure 13:
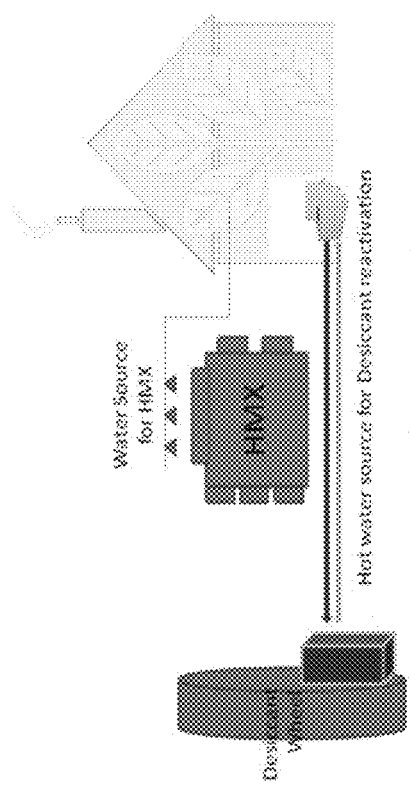
FIG. 13 is a simplified water flow chart for a desiccant-dehumidifer system according to the present disclosure.
Figure 14:
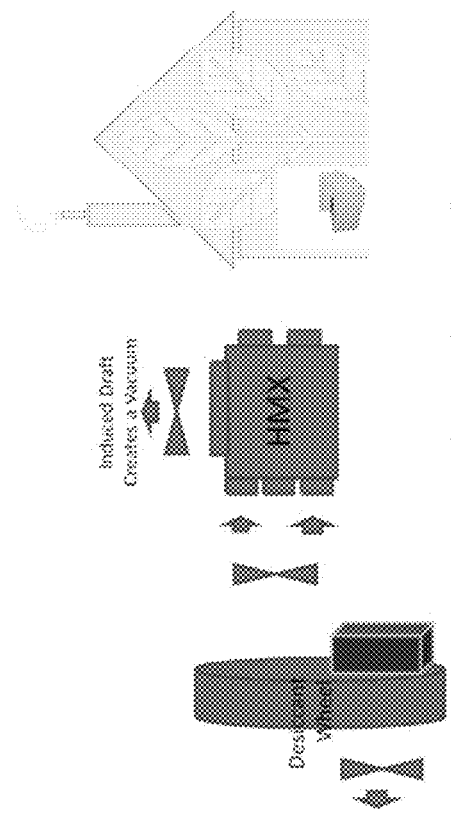
FIG. 14 is a schematic of an exemplary fan location configuration for the system of FIG. 13.

The schematic of FIGS. 13 and 14 illustrates the use of a desiccant wheel and heat and mass exchanger with the power unit. The unit serves as a hot water source for desiccant reactivation. The heat and mass exchanger is positioned downstream of the desiccant wheel and conditions air flow received therefrom prior to supplying the residence. In these examples, the heat and mass exchanger shown in FIGS. 6-9 may be employed.

The system diagram of FIG. 15 shows one preferred embodiment of an air conditioning system according to the present disclosure. The system utilizes the combination of a desiccant wheel and heat and mass exchanger (HMX) (preferably in accordance with a present design). The air flow patterns illustrate the implementation of indirect and direct evaporative cooling to serve the cooling needs of the residence. The air flow chart also shows the receipt of three air flow sources into the supply side of the heat and mass exchanger which may be modulated to achieve desired results. The heat and mass exchanger supply receives a portion from the outside ambient air and airflow passed through the desiccant wheel. Moreover, both cooler recycled air and outside air are passed through the desiccant wheel before receipt by the heat exchanger. The HMX outlets moist air, and supplies dryer air at about 66 to 75° F. (in one embodiment).

The system diagram of FIG. 16 illustrates an alternative embodiment that may be referred to as a "super cooling" system. The system utilizes a second heat and mass exchanger positioned upstream of the desiccant wheel. The first heat exchanger receives both return air from the residence and outdoor air, and passes pre-conditioned, cooler air to the desiccant wheel. The desiccant wheel receives the pre-cooled air as well as a portion of the outdoor air and outputs hotter drier air. This dry air is then passed through the second heat and mass exchanger which outputs cool, dry air for the residence.

Figure 17:
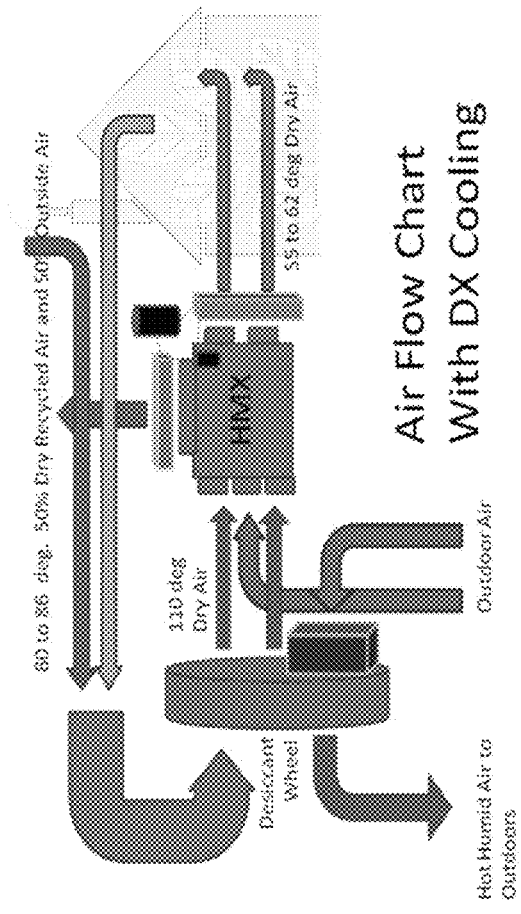
FIG. 17 is a simplified schematic and air flow diagram for an air conditioning system employing direct evaporator cooling according to an alternate embodiment of the present disclosure.
Figure 18:
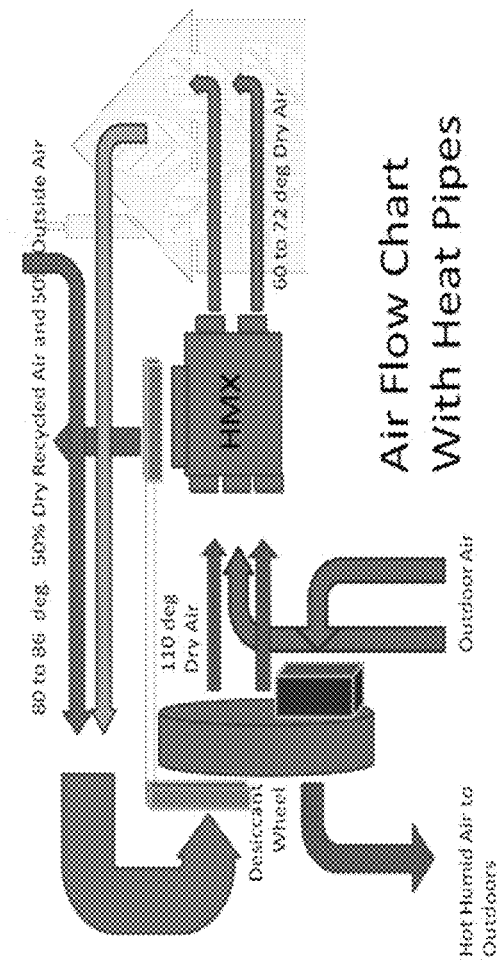
FIG. 18 is a simplified schematic and air flow diagram utilizing heat pipes, according to the present disclosure.

The system diagram of FIG. 17 illustrates an alternate embodiment, which in one respect is a modification of the system of FIG. 15 (which employs "natural" cooling). The system employs direct evaporator cooling.

Figure 19A:
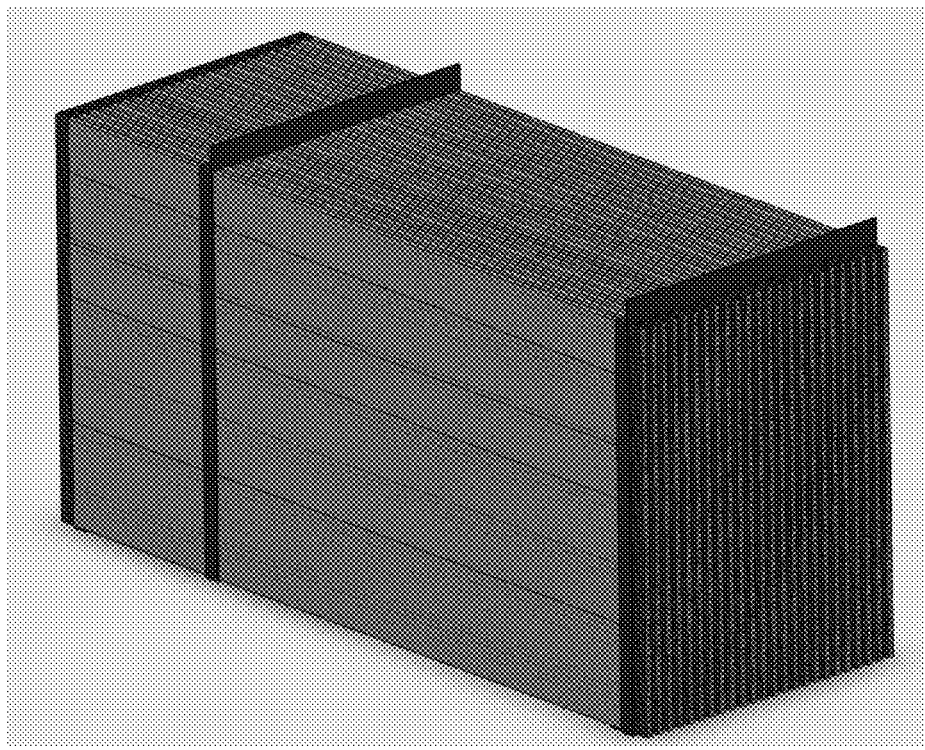
FIGS. 19A-19E are detail views of a preferred core structure of an indirect direct evaporative air conditioner according to the present disclosure.
Figure 19B:
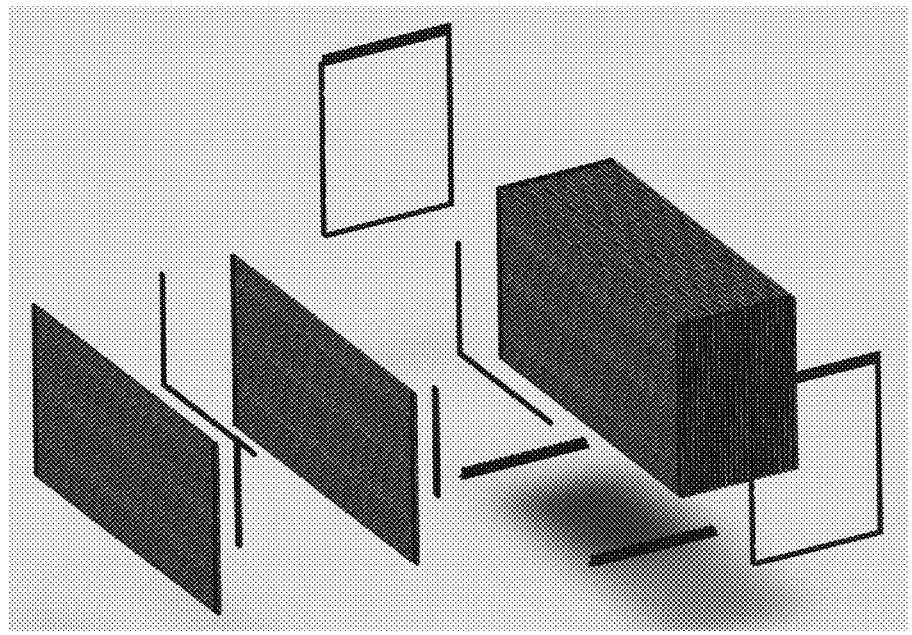
Figure 19C:
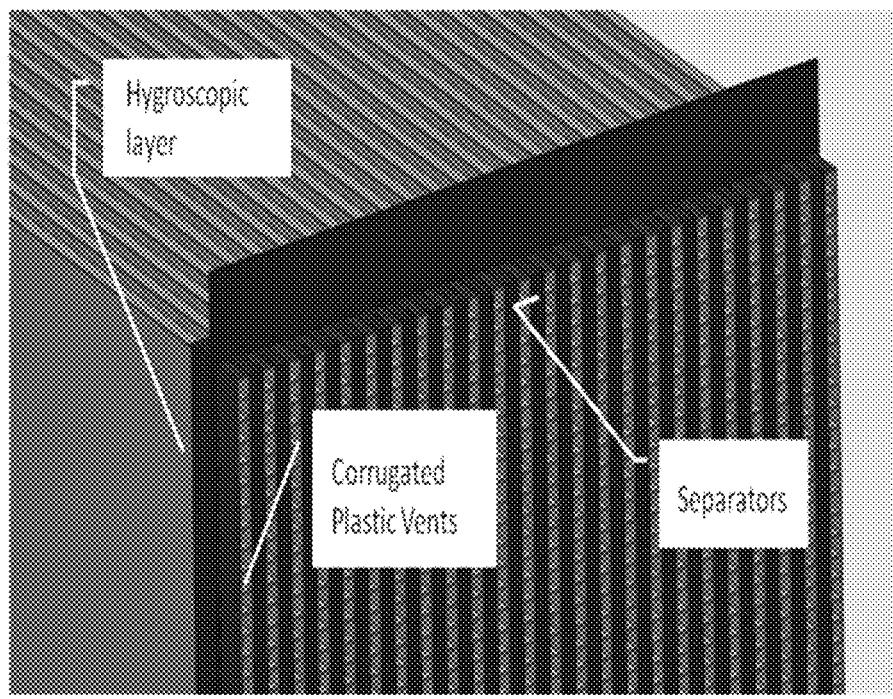
Figure 19D:
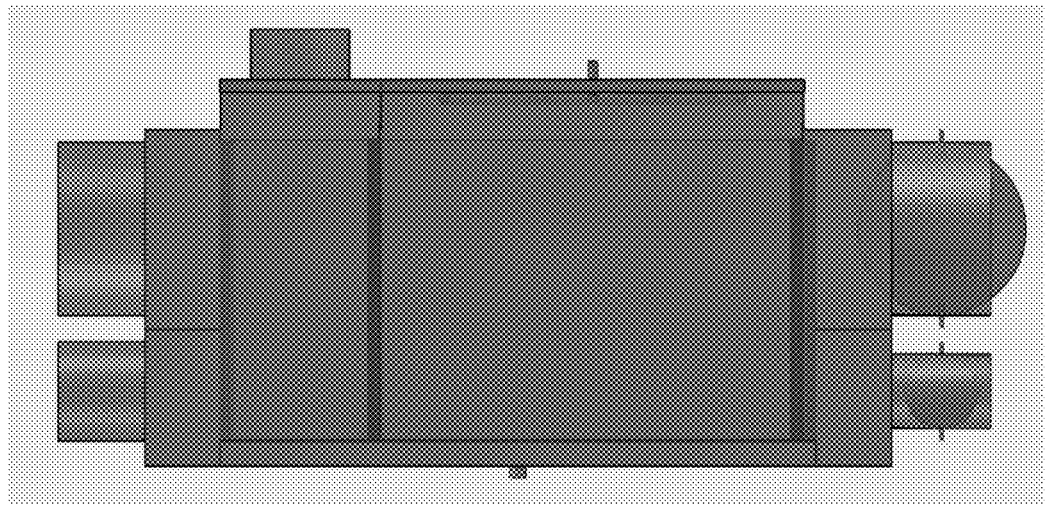
Figure 19E:
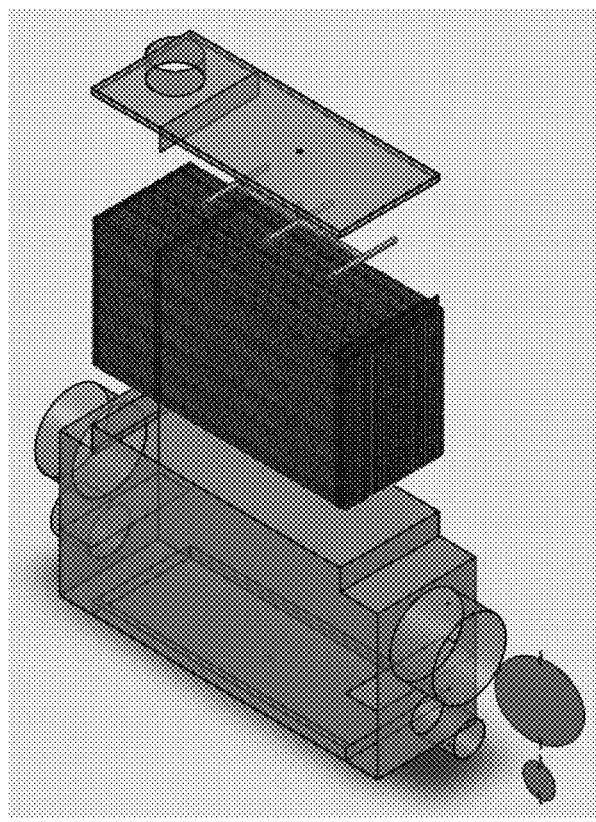
Figure 20:
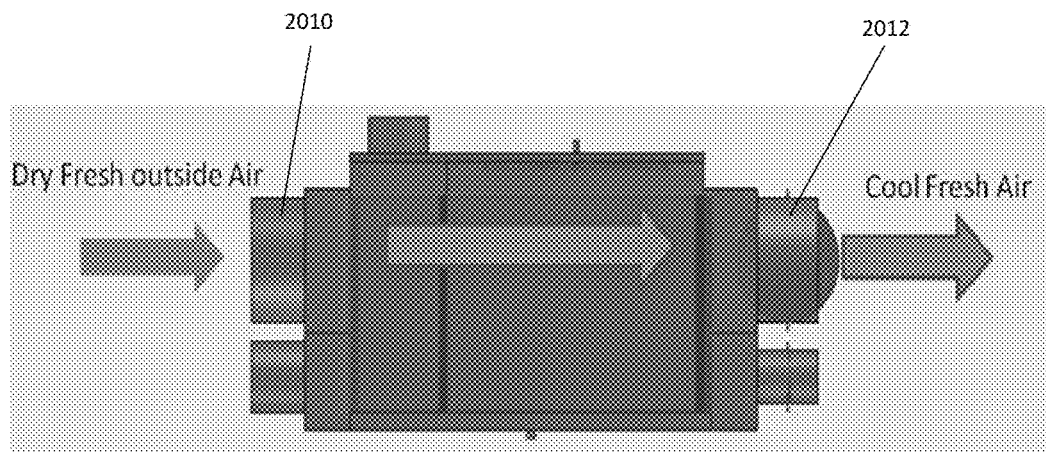
FIG. 20 is a simplified schematic of the air conditioner in FIG. 19 in air pass through operational mode according to the present disclosure.
Figure 21:
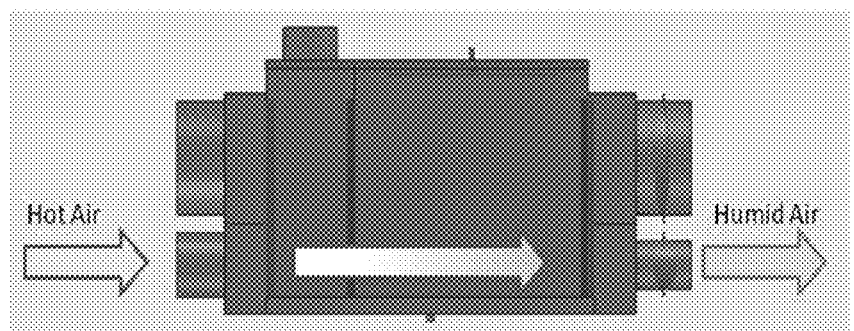
FIG. 21 is a simplified schematic of the air conditioner in FIG. 19 in direct evaporative cooling mode according to the present disclosure.
Figure 22:
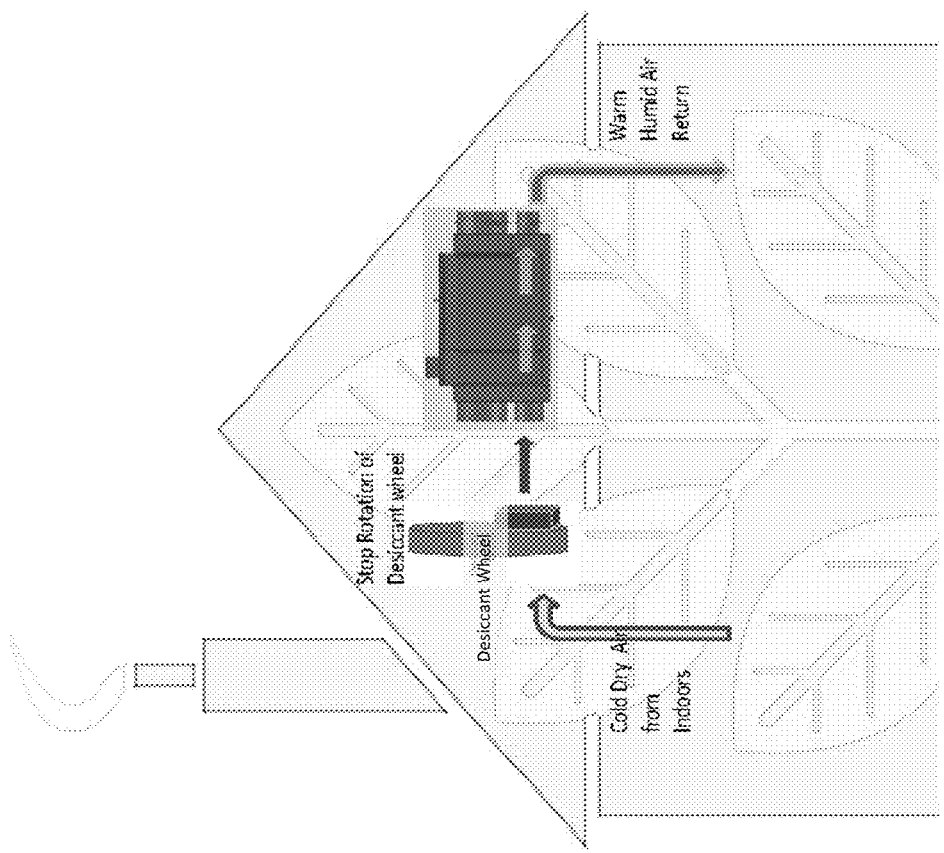
FIG. 22 is a simplified system diagram of an air conditioning system employing the air conditioner and operational mode as illustrated in FIG. 21.
Figure 23:
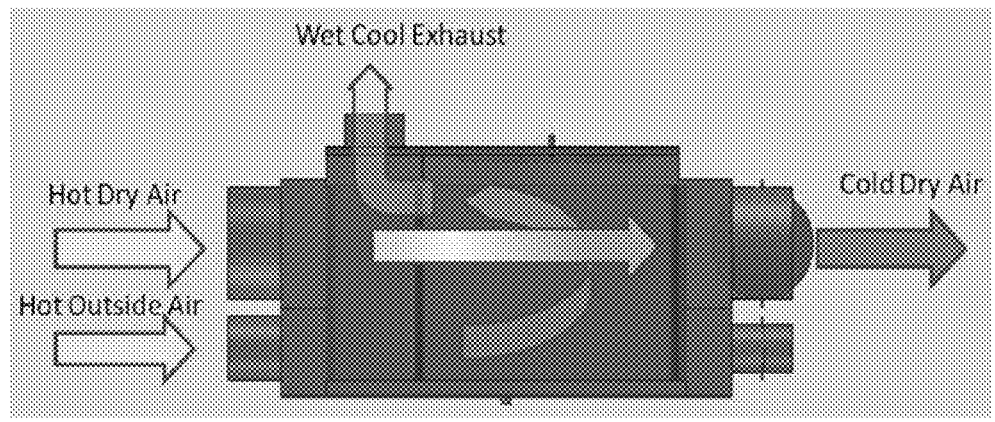
FIG. 23 is a simplified schematic of the air conditioner in FIG. 19 in indirect evaporative cooling (and dew point cooling) mode according to the present disclosure.
Figure 24:
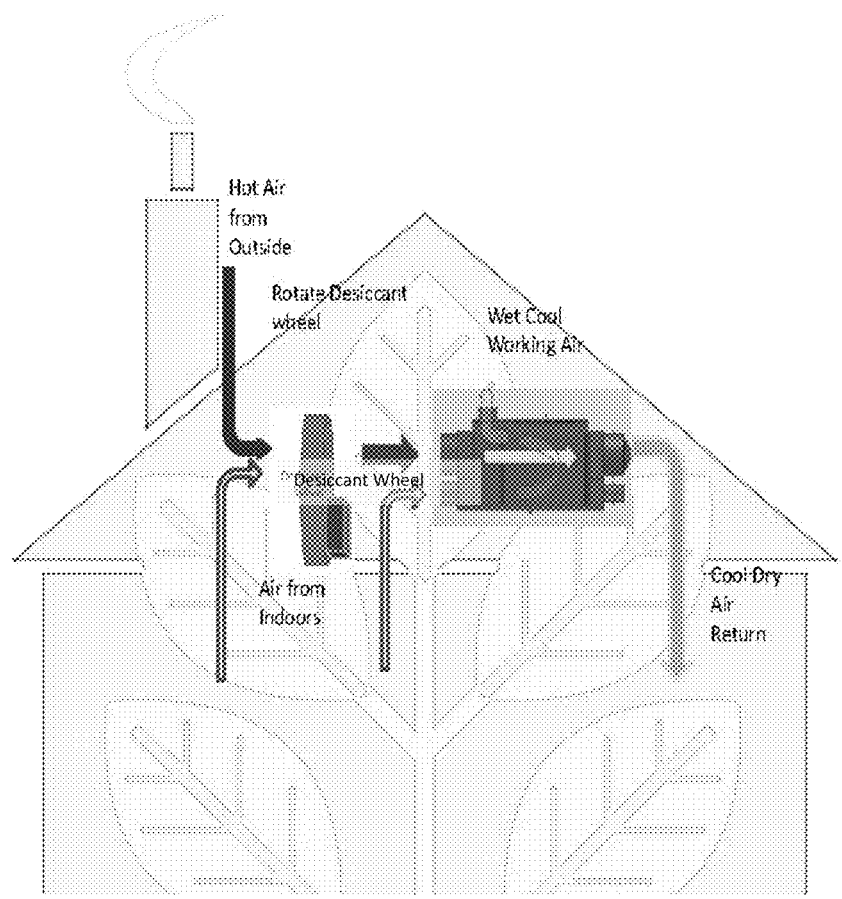
FIG. 24 is a simplified system diagram of an air conditioning system employing the air conditioner and operational mode as illustrated in FIG. 22, according to the present disclosure.
Figure 25:
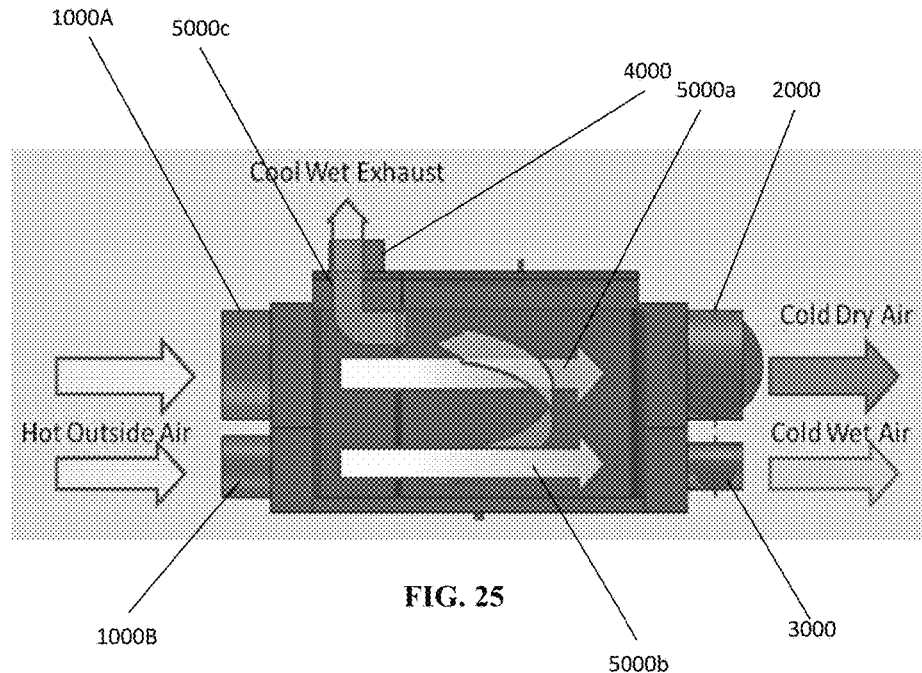
FIG. 25 is a simplified schematic of the air conditioner in FIG. 19 in indirect direct evaporative cooling mode according to the present disclosure.
Figure 26:
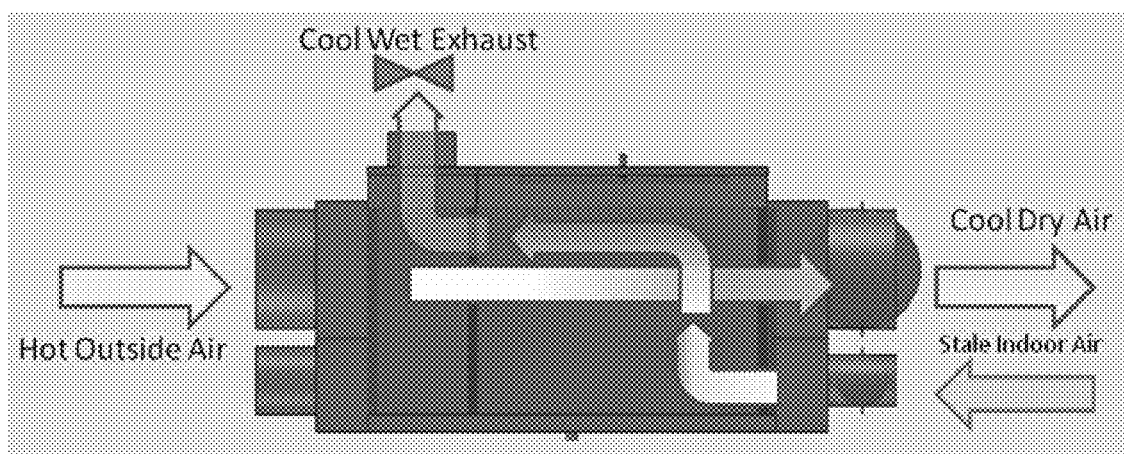
FIG. 26 is a simplified schematic of the air conditioner in FIG. 19 in enthalpy (ERV) mode, according to the present disclosure.

FIGS. 20-26 are simplified illustrations of an indirect direct evaporative air conditioner system (IEC) according to the present disclosure. This equipment may be employed in one or more of the systems described herein. Referring to FIG. 19A, the heart of the system is a rectangular core. The preferred core structure is shown in more detail in FIGS. 19B-19E. In preferred constructions, the module provides a steel enclosure for a natural fiber hygroscopic membrane, with plastic vent panels and plastic separators. As shown, the generally rectangular enclosure has a horizontal or length dimension that is greater than a height or vertical direction or width direction (into the age in the side view Figures). In the embodiment shown, the module is equipped with two air inlets 1000a and 1000b (hot air inlets) on a vertical end surface, an exhaust outlet 4000 (cold wet exhaust outlet) on top surface, and two outlets 2000 (cold dry air outlet) and 3000 (cold wet air outlet) preferably located on a vertical end surface opposite of the inlets (FIG. 25). As generally known in the relevant art, the configuration provides channels in between spaced-panels that define at pre-determined air flow paths 5000a, 5000b, and 5000c (FIG. 25) between the inlets and the exhaust and the inlets and the outlets. At least one air flow path exits as cooled air supply through an outlet to the residence and another air flow path exits as warmed air through the exhaust or, in several embodiments or modes of operation, for further utilization by the system. The flow paths are illustrated in general fashion in the schematics of FIGS. 20-26. These simplified diagrams also illustrate the various operational modes of the IEC, which include the following:

Air Pass Through Mode (see dry fresh outside air inlet 2010 and cool fresh air outlet 2012)
Direct Evaporative Cooling (DEC) Mode (Swamp Cooler/Dehumidifier)
Indirect Evaporatice Cooling (IEC) Mode (Dew Point Cooling)
IEC/DEC Mode Accordingly, with use of the improved IEC Module, several evaporation and cooling techniques may be employed or achieved. One or more of these techniques are illustrated in the Figures and include the following:

Increased Evaporation Air Flow,
Modulated Preheating of Working Air,
Increased Evaporation Surface,
Dehumidification of Working and Process Air,
Water (Refrigerant) Treatment; and
Creation of a Vacuum to reduce evaporation area pressure.

Furthermore, several embodiments of the module and systems incorporating the module are generally suited to further employing waste heat (i.e., as described previously herein) as energy source and reducing loads and reliance on the electric grid. Operation of several of such systems for cooling the residence results in little or no exhaust to the outside. Such systems also serve humidifying and dehumidifying needs of the residence without additional fuel consumptions. Moreover, the use of water as the predominant working fluid, rather than a traditional synthetic refrigerant, is beneficial to the environment.

Figure 27:
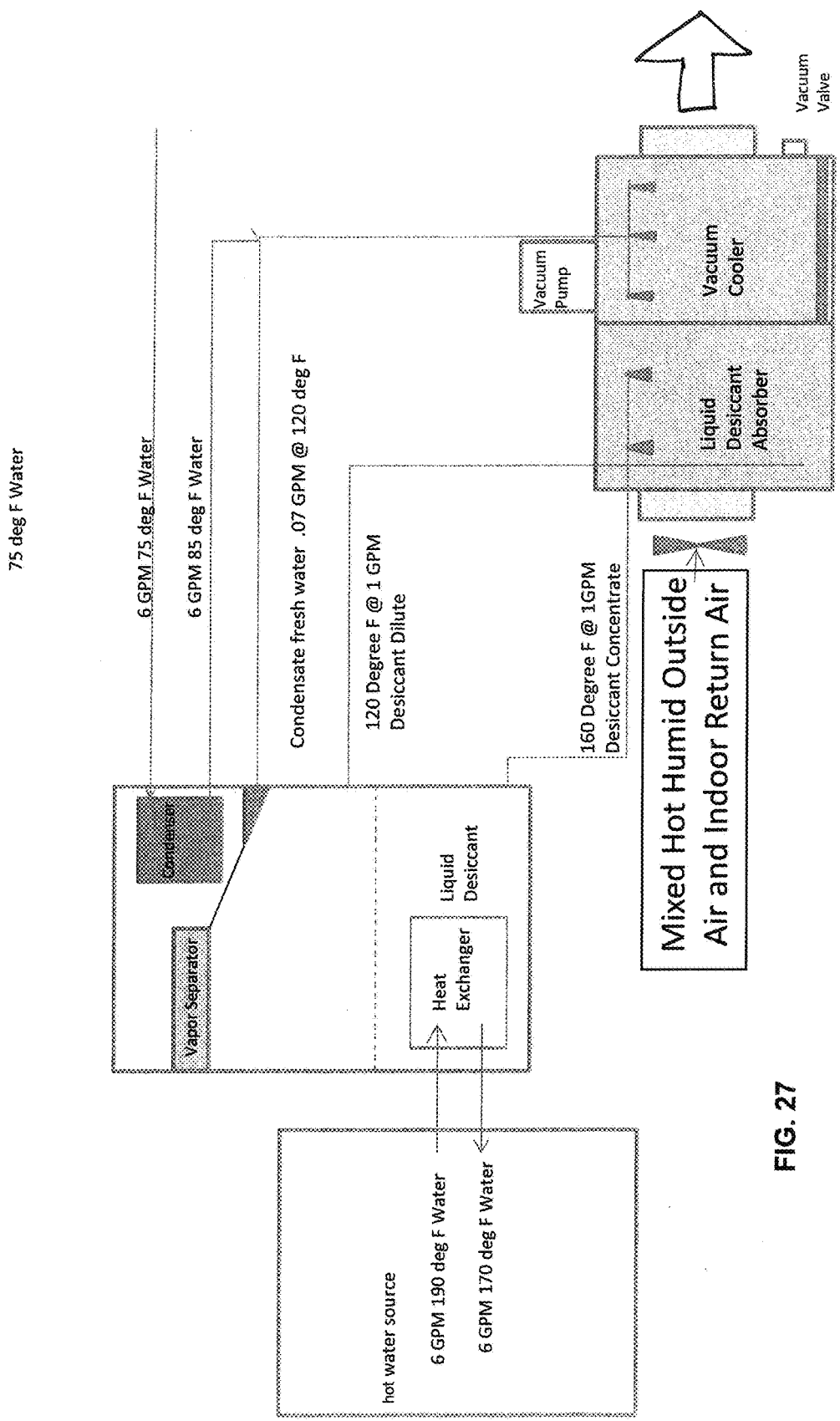
FIG. 27 is a simplified diagram\schematic of an alternative system embodiment employing a closed loop liquid desiccant dehumidification vacuum cooler.
Figure 28:
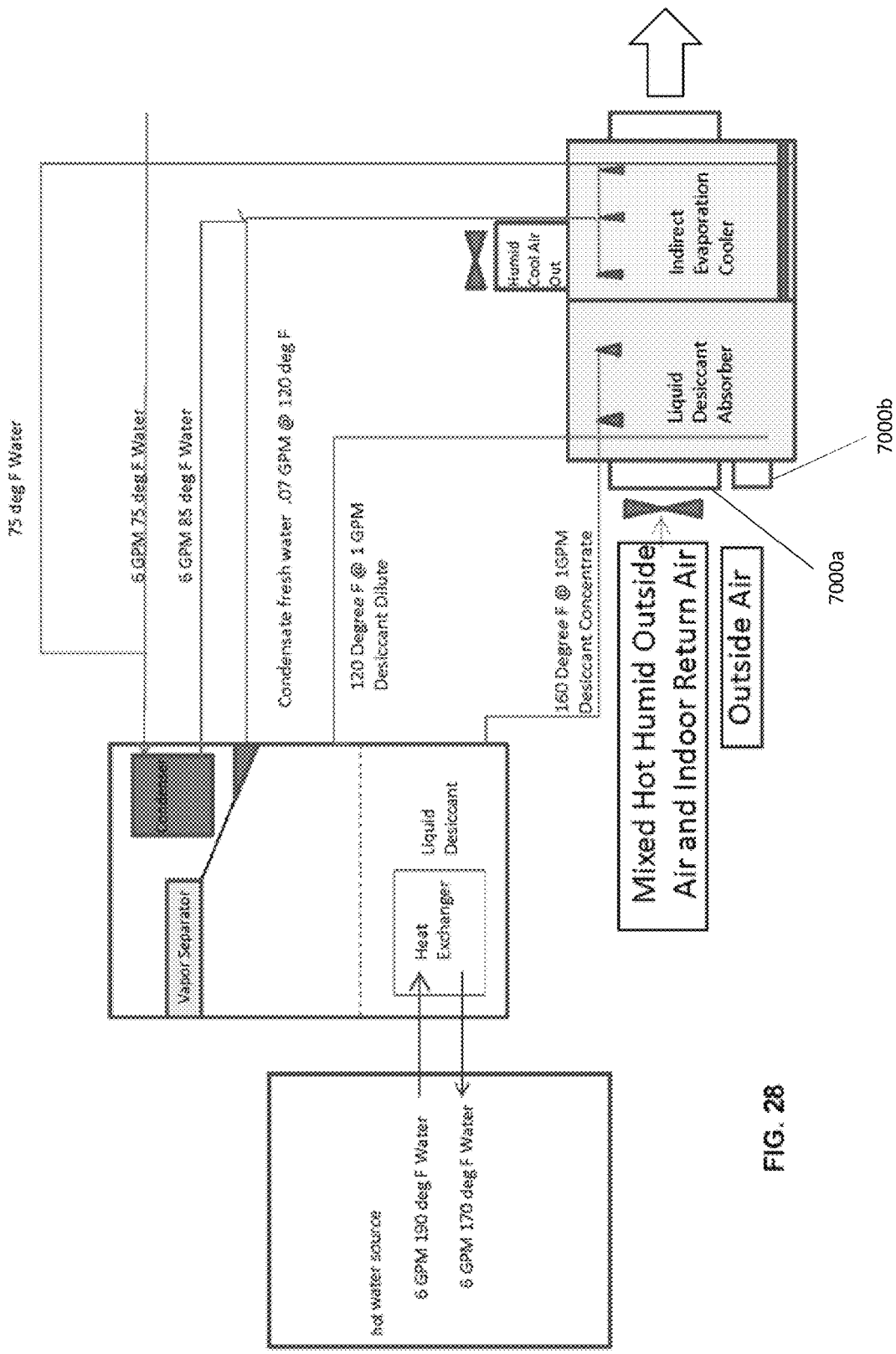
FIG. 28 is a simplified diagram\schematic of an alternative system embodiment employing a closed indirect evaporative cooler, according to the present disclosure.

In an alternative embodiment, as illustrated in FIG. 27, the system employs a vacuum cooler in a closed loop system (waste heat evaporator), which uses water as the operating fluid-refrigerant. More particularly, the heat and mass exchanger is modified to operate with a vacuum cooler adjacent and upstream of a liquid desiccant absorber. As shown, a vacuum pump is operated with the vacuum cooler. The liquid desiccant absorber received mixed hot humid outside air and indoor air via inlet 7000a, as well as solely outside air via line 7000b (FIG. 28). As shown in the system diagram, a heat exchanger is positioned to interact with (and heat) liquid desiccant. Warmer desiccant concentrate is communicated to the liquid desiccant absorber and cooler desiccant dilute is returned. Cool dry air is discharged from the vacuum cooler to the target environment. The system is also equipped with a condenser and vapor separator to treat and cycle system water passing from and to the vacuum cooler. In a further alternative embodiment, as illustrated in FIG. 28, the closed loop system employs an indirect evaporative cooler in place of the vacuum cooler. Humid cool air is exhausted from the cooler and cool dry air is supplied to the target environment.

In a method operating the closed loop system of FIG. 27 or 28, the system recovers condensate absorbed by the desiccant. Minimizing liquid desiccant exposure, the closed loop system reduces the corrosion effects on system components and associated systems and equipment, and other damage otherwise caused by liquid desiccant exposure. The system also reduces system water loss and produces clean distilled water.

The foregoing description has been presented for purposes of illustration and description of preferred embodiments. This description is not intended to limit associated concepts to the various systems, apparatus, structures, and methods specifically described herein. For example, system and methods described in the context of a residence, may be applicable, in part or in entirety, to other permanent or stationary installations, such as commercial office building, factory, warehouse or other workplace, or such non-permanent but defined localized environments, as long-haul trucks or similar powered mobile vehicles. The embodiments described and illustrated herein are further intended to explain the best and preferred modes for practicing the system and methods, and to enable others skilled in the art to utilize same and other embodiments and with various modifications required by the particular applications or uses of the present invention.

What is claimed is:

1. A system for supplying cooling air to a residence or building interior comprising:
   an indirect-direct evaporative air conditioner module in the form of a heat and mass exchanger positioned to discharge conditioned air into the residence or building interior; and
   a rotatable desiccant wheel dehumidifier;
   wherein the desiccant wheel dehumidifier is positioned and configured to receive supply air for treatment, exhaust hot, humid air, and supply dry air to the heat and mass exchanger; and
   wherein the heat and mass exchanger is positioned and configured to receive dry air from the dehumidifier and supply cooler dry air to the residence or building interior; and
   wherein said module includes an enclosure and a heat exchanger core supported therein separating wet and dry air streams, the enclosure being equipped with a plurality of inlets for supplying air to the heat exchanger core, a plurality of outlets for discharging air, wherein a plurality of air flow channels is configured between said inlets and outlets and defines air flow paths through the heat exchanger core, each flow path exiting through one of said outlets, including an air flow path supplied by a hot air inlet and discharging cold dry air through a cold dry air outlet into the residence or building interior, an air flow path discharging exhaust air through an exhaust outlet, and an air flow path supplied by a hot air inlet and discharging cold wet air though a cold wet air outlet into the residence or building interior, such that said module is operable in an indirect\direct evaporative cooling mode, such that the hot air inlets receive hot dry air and hot outside air, the exhaust outlet discharges wet cool exhaust air, the cold dry air outlet discharges the cold dry air into the residence or building interior, and the cold wet air outlet discharges the cold wet air into the residence or building interior.

2. The system of claim 1, wherein the dehumidifier is positioned and configured to receive dry recycled air from the residence or building interior, or wherein the dehumidifier is positioned and configured to receive outdoor air for treatment.

3. The system of claim 1, wherein the dehumidifier is positioned and configured to receive less than 80 to 85 deg. F. dry recycled air and deliver above 100 deg. F. dry air to the heat and mass exchanger and the heat and mass exchanger is positioned to supply dry air below 78 deg. F. to the residence or building interior.

4. The system of claim 1, further comprising a heat and mass exchanger module positioned upstream of the dehumidifier to deliver pre-conditioned cooled air supply air to the dehumidifier and configured to receive both return conditioned air from the residence or building interior and outdoor air for treatment and passes cooler pre-conditioned, cooler air to the dehumidifier and the dehumidifier receives said pre-conditioned cooler air and outdoor air and outputs hotter drier air for supply downstream to said air conditioner module.

5. The system of claim 1, wherein the heat and mass exchanger includes a vacuum chamber positioned on a discharge side from which said cool supply air discharged to the residence or building interior travels.

6. The system of claim 1, wherein the heat and mass exchanger includes a vacuum chamber positioned on an exhaust side through which exhaust air exits.

7. The system of claim 1, wherein the heat and mass exchanger is configurable in direct evaporative cooling mode.

8. The system of claim 1, wherein the heat and mass exchanger is configurable and operable in enthalpy mode, such that the hot air inlets receive hot outside air, the exhaust discharges wet cool exhaust, the cold air outlet discharges cool dry air, and an auxiliary port is selectively positionable and operable to receive stale indoor air from within the residence or building interior into the heat and mass exchanger.

9. The system of claim 8, wherein said enclosure has an air supply side including a vertical surface equipped with said inlets, a discharge side including a vertical surface equipped with at least two of said out lets and disposed on a side opposite of said supply side, said exhaust outlet being located on a side extending between the supply side having a surface and discharge side and equipped with an exhaust outlet.

10. The system of claim 1, further comprising a second of said indirect-direct evaporative air conditioner module positioned upstream of the dehumidifier to deliver pre-conditioned cooled air supply air to the dehumidifier, exhaust hot humid air, said heat and exchanger module being configured to receive both return conditioned air from the residence or building interior and outdoor air for treatment and pass pre-conditioned, cooler air to the dehumidifier and said dehumidifier or building interior receive said pre-conditioned cooler air and outdoor air and output hotter drier air for supply downstream to said first air conditioner module.

11. The system of claim 1, wherein said residence or building interior includes a hot water heater, said system further including a hot water line from the water heater to the dehumidifier to supply heat thereto.

12. The system of claim 1, further comprising a vacuum chamber cooler positioned on a discharge side of said module from which cool supply air is discharged to the residence or building interior, and a liquid desiccant absorber disposed adjacent and upstream of said cooler having an inlet to receive mixed hot humid outside air and return indoor air, and an inlet to receive outside air, and wherein said heat module is configured deliver dessicant concentrate to said absorber and receive cooler desiccant dilute therefrom.

13. A system for supplying cooling air to a residence or building interior comprising:
   an air conditioning module including a heat and mass exchanger module, for discharging conditioned air into the residence or building interior; and
   a desiccant dehumidifier;
   wherein the desiccant dehumidifier is positioned and configured to receive supply air for treatment, exhaust hot, humid air, and supply dry air to the heat and mass exchanger; and wherein the air conditioning module is positioned and configured to receive dry air from the dehumidifier and discharge cooler dry air to the residence or building interior; and wherein said heat and mass exchanger module is a direct-indirect air conditioning module including an enclosure equipped with inlets and outlets, and defining a heat exchanger core space therein, such that a plurality of air flow channels is configurable between said inlets and outlets and spaced apart panels of a heat exchanger core supported in said heat exchanger space including flow channels for two or more of the following heat exchanger operating modes:

an air pass-through mode, including a dry fresh outside air inlet for receipt of dry fresh outside air in fluid communication with a cool fresh air outlet for discharging cool fresh air into the residence or building interior;

a direct evaporative cooling mode, including a hot air inlet for receipt of hot air in fluid communication with a humid air outlet for discharge of humid air into the residence or building interior;

an indirect evaporative cooling mode, including a hot dry air inlet for receipt of hot dry air in fluid communication with a cool dry air outlet for discharge of cool dry air into the residence or building interior, and a hot outside air inlet for receipt of hot outside air in fluid communication with a wet cool exhaust outlet for discharge of wet cool exhaust; and an indirect-direct cooling mode, including a first hot outside air inlet for receipt of hot outside air in fluid communication with a cold dry air outlet for discharge of cold dry air into the residence or building interior, a second hot outside air inlet for receipt of hot outside air in fluid communication with both a cold wet air outlet for discharge of cold wet air into the residence or building interior and a cool wet exhaust outlet for discharge of cool wet exhaust.

14. The system of claim 13, further comprising a heat and mass exchanger module positioned upstream of the dehumidifier to deliver pre-conditioned cooled air supply air to the dehumidifier and configured to receive both return conditioned air from the residence or building interior and outdoor air for treatment and pass pre-conditioned, cooler air to the dehumidifier and said dehumidifier is configured to receive said pre-conditioned cooler air and outdoor air and output hotter drier air for supply downstream to said first air conditioner module.

15. The system of claim 13, wherein the heat and mass exchanger is configurable and operable in enthalpy mode, including inlet ports to receive hot outside air, an exhaust to discharge wet cool exhaust, an outlet to discharge cool dry air into the residence or building interior, and an auxiliary port selectively positionable and operable to receive stale indoor air from within the residence or building interior into the heat and mass exchanger.

16. The system of claim 13, wherein said heat exchanger module includes a plurality of outlets for discharging air from the heat exchanger, wherein a plurality of air flow channels is configured between said inlets and outlets and defining air flow paths through a heat exchanger core supported by the enclosure, each flow path exiting through one of said outlets, including an air flow path supplied by a hot humid air inlet and discharging cold dry air into the residence or building interior through a cold dry air outlet, an air flow path discharging air through an exhaust outlet, and an air flow path supplied by a hot humid air inlet and discharging cold wet air into the residence or building interior though a cold wet air outlet, such that said module is operable in indirect\direct evaporative cooling mode.

17. The system of claim 16, wherein said heat exchanger module is configurable and operable, with said dehumidifier, in natural non-evaporative cooling mode, simultaneous direct/indirect cooling mode, indirect cooling mode, and direct cooling mode.

18. The system of claim 13, further comprising a vacuum chamber cooler positioned on a discharge side from which cool supply air discharged to the residence or building interior travels; and a liquid desiccant absorber adjacent and upstream of said cooler having an inlet to receive mixed hot humid outside air and return indoor air, and an inlet to receive outside air, and wherein said heat module is configured deliver desiccant concentrate to said absorber and receive cooler desiccant dilute therefrom.

19. The system of claim 13, wherein the plurality of air flow channels are configurable between said inlets and outlets and spaced apart panels of the heat exchanger core supported in said heat exchanger space including flow channels for each of the following heat exchanger operating modes: the air pass-through mode; the direct evaporative cooling mode; the indirect evaporative cooling mode; and the indirect-direct cooling mode.

20. A system for supplying air to a residence or building interior comprising:

an evaporative air conditioner module including a heat and mass exchanger positioned to discharge conditioned air into the residence or building interior;

a dehumidifier positioned and configured to receive supply air for treatment, to exhaust hot humid air, and to supply dry air to the heat and mass exchanger, wherein the heat and mass exchanger is positioned and configured to receive the dry air from the dehumidifier and supply air to the residence or building interior;

wherein said heat and mass exchanger includes an enclosure equipped with inlets and outlets, a heat exchanger core within the enclosure, and a plurality of air flow channels between said inlets and outlets and between spaced apart panels of the heat exchanger core, including air flow channels for each the following heat and mass exchanger operating modes:

an air pass-through mode, including a dry fresh outside air inlet for receipt of dry fresh outside air into the heat and mass exchanger, the dry fresh outside air inlet in fluid communication via one of the air flow channels with a cool fresh air outlet of the heat and mass exchanger for discharging cool fresh air into the residence or building interior;

a direct evaporative cooling mode, including a hot air inlet for receipt of hot air into the heat and mass exchanger, the hot air inlet in fluid communication via one of the air flow channels with a humid air outlet of the heat and mass exchanger for discharge of humid air into the residence or building interior;

an indirect evaporative cooling mode, including a hot dry air inlet for receipt of hot dry air into the heat and mass exchanger, the hot dry air inlet in fluid communication via one of the air flow channels with a cool dry air outlet of the heat and mass exchanger for discharge of cool dry air into the residence or building interior, and a hot outside air inlet for receipt of hot outside air into the heat and mass exchanger, the hot outside air inlet in fluid communication via one of the air flow channels with a wet cool exhaust outlet of the heat and mass exchanger for discharge of wet cool exhaust;

an indirect-direct cooling mode, including a first hot outside air inlet for receipt of hot outside air into the heat and mass exchanger, the first hot outside air inlet in fluid communication via one of the air flow channels with a cold dry air outlet of the heat and mass exchanger for discharge of cold dry air into the residence or building interior, a second hot outside air inlet for receipt of hot outside air into the heat and mass exchanger in fluid communication via one of the air flow channels with both a cold wet air outlet of the heat and mass exchanger for discharge of cold wet air into the residence or building interior and a cool wet exhaust outlet of the heat and mass exchanger for discharge of cool wet exhaust; and an enthalpy mode, including inlets to receive hot outside air into the heat and mass exchanger, an outlet to discharge cool dry air from the heat and mass exchanger into the residence or building interior, an auxiliary port selectively positionable and operable to receive stale indoor air from within the residence or building interior into the heat and mass exchanger, and an exhaust to discharge the relieved stale indoor air as wet cool exhaust from the heat and mass exchanger.

* * * * *